US008295203B2

(12) United States Patent
Ramakrishnan et al.

(10) Patent No.: US 8,295,203 B2
(45) Date of Patent: Oct. 23, 2012

(54) METHODS AND SYSTEMS TO STORE STATE USED TO FORWARD MULTICAST TRAFFIC

(75) Inventors: Kadangode K. Ramakrishnan, Berkeley Hgts., NJ (US); Divesh Srivastava, Summit, NJ (US); Tae W. Cho, Austin, TX (US); Yin Zhang, Austin, TX (US); Michael Rabinovich, Solon, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 612 days.

(21) Appl. No.: 12/060,709

(22) Filed: Apr. 1, 2008

(65) Prior Publication Data

US 2009/0052448 A1  Feb. 26, 2009

Related U.S. Application Data

(60) Provisional application No. 60/957,782, filed on Aug. 24, 2007.

(51) Int. Cl.
*H04L 12/28* (2006.01)
(52) U.S. Cl. ........ 370/256; 370/312; 370/390; 370/432; 455/519
(58) Field of Classification Search .................. None
See application file for complete search history.

(56) References Cited

U.S. PATENT DOCUMENTS

| 5,331,637 | A | * | 7/1994 | Francis et al. | ............... 370/408 |
| 5,959,989 | A | * | 9/1999 | Gleeson et al. | ............... 370/390 |
| 6,442,596 | B1 | | 8/2002 | Dyer et al. | |
| 6,671,276 | B1 | | 12/2003 | Bakre et al. | |
| 6,718,361 | B1 | | 4/2004 | Basani et al. | |
| 6,950,432 | B2 | | 9/2005 | Chen et al. | |
| 7,007,040 | B1 | * | 2/2006 | Duke et al. | ............... 707/200 |
| 7,194,002 | B2 | | 3/2007 | Zhang et al. | |

(Continued)

FOREIGN PATENT DOCUMENTS

EP  1747644  11/2005

(Continued)

OTHER PUBLICATIONS

Cui, Jun-Hong, et al., "An Architecture for Scalable QoS Multicast Provisioning", *UCLA CSD TR # 010030*, http://citeseer.ist.psu.edu/cui01architecture.html, (2001), 21 pgs.

*Primary Examiner* — Bob Phunkulh
*Assistant Examiner* — Jenkey Van
(74) *Attorney, Agent, or Firm* — Guntin Meles & Gust, PLC; Pablo Meles

(57) ABSTRACT

Methods and systems are described to store state used to forward multicast traffic. The system includes a receiving module to receive request to add a first node to a membership tree. The membership tree includes a first plurality of nodes associated with a multicast group. The system further includes a processing module to identify a second node in the first plurality of nodes and to communicate a node identifier that identifies the first node over a network to the second node. The node identifier is to be stored at the second node to add the first node to the membership tree. The node identifier is further to be stored in the membership tree exclusively at the second node to enable the second node to forward the multicast traffic to the first node.

16 Claims, 19 Drawing Sheets

U.S. PATENT DOCUMENTS

| | | |
|---|---|---|
| 7,450,526 B2 * | 11/2008 | Yang .............................. 370/255 |
| 7,564,806 B1 | 7/2009 | Aggarwal |
| 7,830,787 B1 | 11/2010 | Wijnands |
| 2001/0018714 A1 | 8/2001 | Yagyu |
| 2002/0150094 A1 | 10/2002 | Cheng |
| 2003/0185209 A1 | 10/2003 | Lee |
| 2003/0223372 A1 | 12/2003 | Sanchez |
| 2005/0108419 A1 | 5/2005 | Eubanks |
| 2006/0098607 A1 * | 5/2006 | Zeng et al. ................... 370/338 |
| 2006/0133375 A1 | 6/2006 | Napierala |
| 2007/0110062 A1 | 5/2007 | Bala et al. |
| 2008/0205394 A1 * | 8/2008 | Deshpande et al. ......... 370/390 |
| 2009/0052449 A1 | 2/2009 | Ramakrishnan et al. |
| 2009/0201844 A1 * | 8/2009 | Bhatti et al. ................. 370/312 |

FOREIGN PATENT DOCUMENTS

| | | | |
|---|---|---|---|
| WO | WO-2005109772 A2 | 11/2005 | |

* cited by examiner

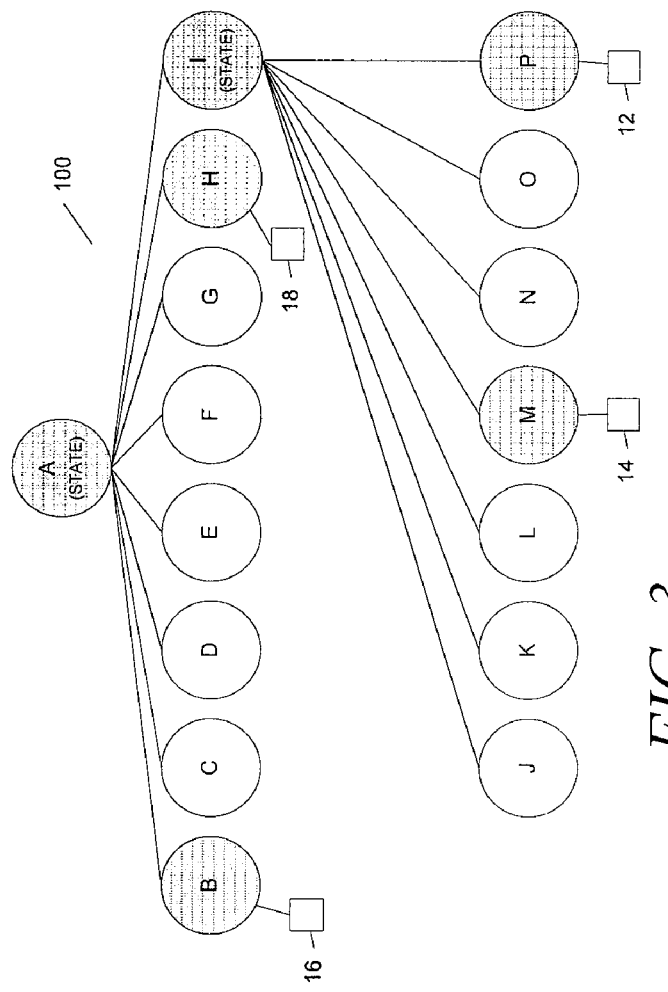
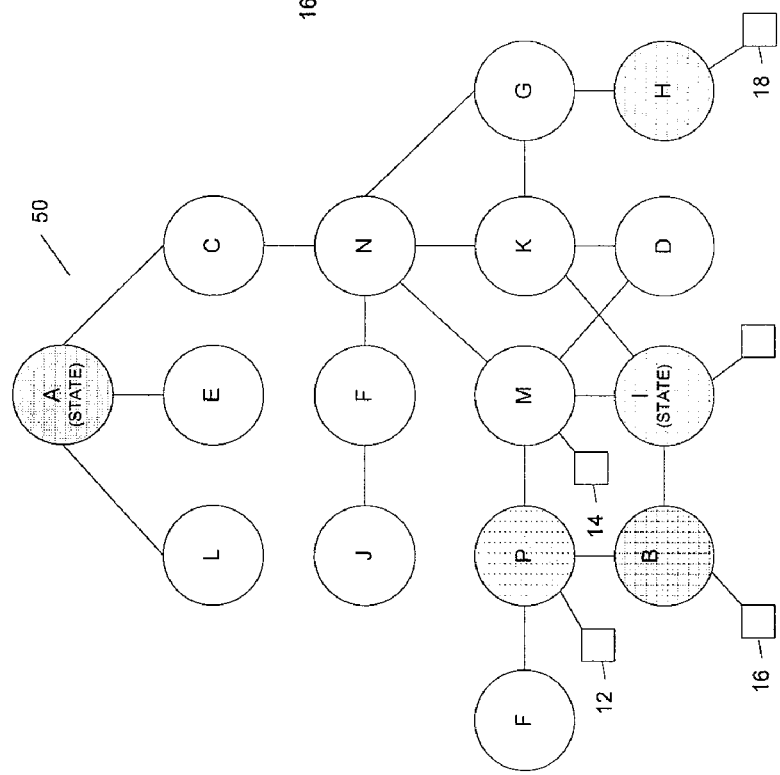
*FIG. 3*
*FIG. 2*

| Logical node identifiers for base tree 900 | Binary of logical node identifiers for base tree 900 | Logical node identifier of core (e.g., root) node for base tree 910 | Resultant Logical node Identifiers for base tree 910 in binary | Logical node identifiers for base tree 910. |
|---|---|---|---|---|
| 0 | 0000 | 0010 | 0010 | 2 |
| 1 | 0001 | 0010 | 0011 | 3 |
| 2 | 0010 | 0010 | 0000 | 0 |
| 3 | 0011 | 0010 | 0001 | 1 |
| 4 | 0100 | 0010 | 0110 | 6 |
| 5 | 0101 | 0010 | 0111 | 7 |
| 6 | 0110 | 0010 | 0100 | 4 |
| 7 | 0111 | 0010 | 0101 | 5 |
| 8 | 1000 | 0010 | 1010 | 10 |
| 9 | 1001 | 0010 | 1011 | 11 |
| 10 | 1010 | 0010 | 1000 | 8 |
| 11 | 1011 | 0010 | 1001 | 9 |

*FIG. 24*

METHODS AND SYSTEMS TO STORE STATE USED TO FORWARD MULTICAST TRAFFIC

This application claims the priority benefits of U.S. Provisional Application No. 60/957,782, filed Aug. 24, 2007 which is incorporated herein by reference.

FIELD

Embodiments relate generally to the technical field of data communications.

BACKGROUND

Multicast is a communication technology that may be used to communicate data from a single source to multiple destinations. Such an approach lends itself well to groups that naturally share data. For example, a news service may track news stories on a particular subject that may be shared in a timely manner with a growing number of subscribers interested in the subject.

BRIEF DESCRIPTION OF DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details. The present disclosure is illustrated by way of example and not limitation in the figures of the accompanying drawings, in which like references indicate similar elements and in which:

FIG. 2 is a diagram illustrating a physical representation of a membership tree, according to one example embodiment;

FIG. 3 is a diagram illustrating a logical representation of a membership tree, according to one example embodiment;

FIG. 24 is a table 912, according to an embodiment, illustrating a generation of one base tree from another;

DETAILED DESCRIPTION

Figure 1:
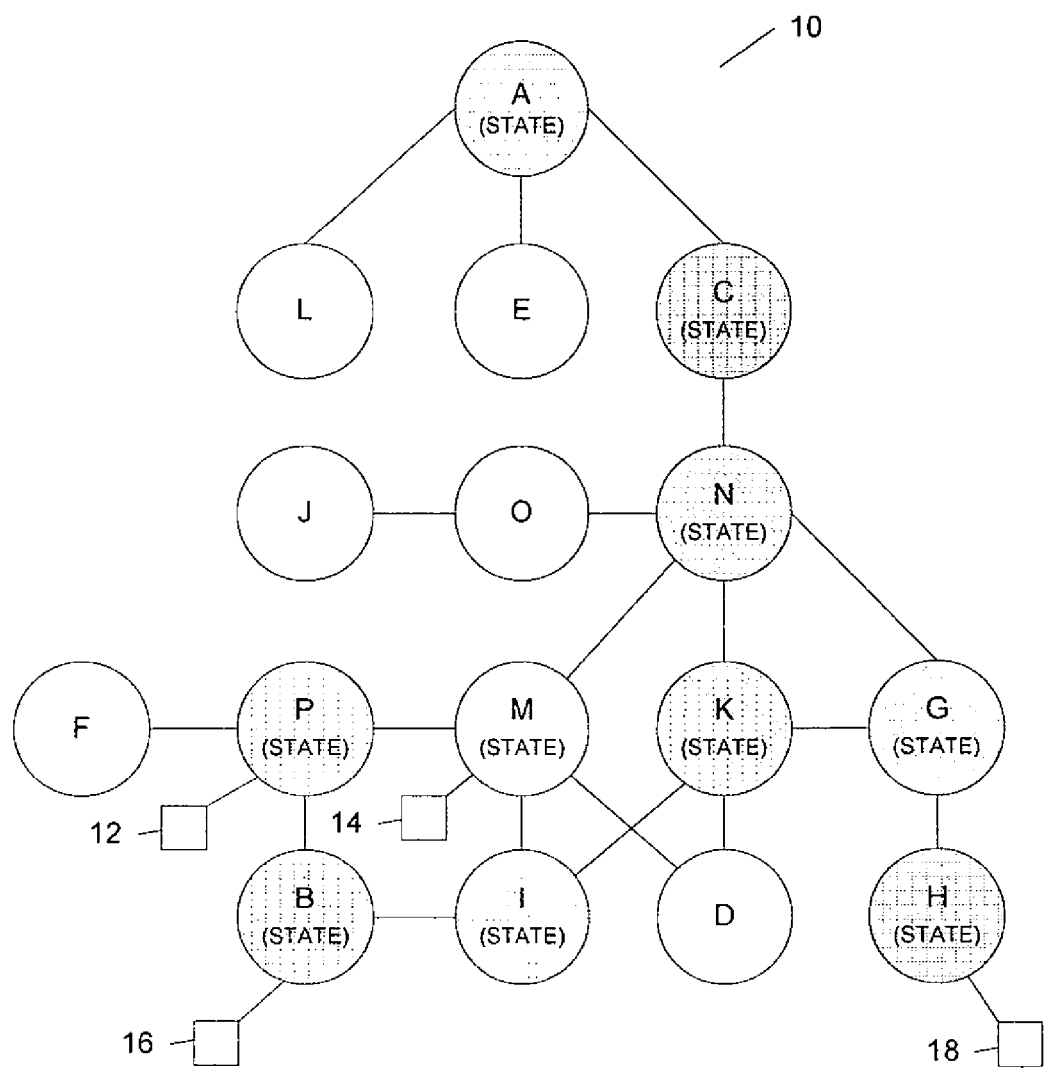
FIG. 1 is a diagram illustrating a dissemination tree, according to one example embodiment, to forward multicast traffic.

Multicast may use network and server resources to efficiently distribute information to groups. Users may increasingly demand publish-subscribe based access to fine-grained information. Accordingly, multicast may need to evolve to (i) manage an increasing number of groups, with a distinct group for each piece of distributable content; (ii) support persistent group membership, as group activity may vary over time, with intense activity at some times, and infrequent (but still important) activity at others. These requirements may raise scalability challenges that are not met by today's multicast techniques. According to an embodiment, Multicast with Adaptive Dual-state (MAD) architecture may support a vast number of multicast groups, with varying activity over time, based on: (i) decoupling group membership from forwarding information, and (ii) applying an adaptive dual-state approach to optimize for the different objectives of active and inactive groups. MAD may further be embodied across administrative boundaries by partitioning routers into "MAD domains," enabling autonomous decisions in local domains.

An important issue, of course, is how to identify "information." It is important to enable sharing of information at a fine enough granularity to ensure that only relevant and non-redundant information may be accessed and disseminated. Producers and consumers of a specific piece of fine granularity information may be viewed as members of an information-centric multicast group. A consequence of this model may be that existing multicast approaches need to change.

First, because of the increasing amount of electronic content produced and consumed by multicast-friendly applications, multicast may need to manage an ever increasing number (e.g., billions or even hundreds of billions) of multicast groups, with a distinct multicast group for each piece of distributable content.

Second, multicast group activity may naturally vary significantly over time, with intense activity at some times (e.g., during periods of natural disasters), and infrequent activity at others (e.g., when monitoring for potential natural disasters). Since the importance of the information disseminated may be independent of the level of group activity, and group membership may be long-lived, the membership of the multicast group needs to be maintained persistently to support timely information dissemination.

Supporting such fine granularity information-centric multicast communications may raise challenges that are not met by today's Internet Protocol (IP) and overlay multicast technologies. IP multicast has focused on efficient forwarding of information (e.g., few hops) to a large active group of recipients, with the goal of efficient lookup for forwarding. IP multicast-style approaches at the network layer or at the application layer with "overlay multicast" to try to keep a relatively small amount of state (e.g., limited number of groups and the associated interfaces downstream with recipients for the group). However, this state may be maintained at every node in the multicast tree of the group for efficient forwarding. Thus, maintaining state may be expensive. Further, these existing models for multicast may use considerable control overhead (periodic refresh and pruning) to try to minimize the amount of state retained. IP multicast-style approaches may be inappropriate for several reasons. First, IP multicast-style approaches may be appropriate for a relatively small number of groups, but are not feasible for the present scale (e.g., billions of groups) with reasonable amounts of memory at individual network nodes. Second, when groups are long-lived, but have little or no activity over long periods of time, maintaining the membership state in IP multicast-style approaches may require a relatively high amount of control overhead (relative to the activity) to keep it from being aged-out.

In contrast to the above described IP multicast-style approaches, the present approach, according to one embodiment, will minimize the amount of control overhead associated with keeping state up over a long time, especially when groups are inactive. However, for active groups, advantage may be taken of the structures that existing IP multicast has adopted. Thus, the present approach may utilize forwarding efficiencies (e.g., IP multicast) when information is frequently generated, and also enable the membership of a group to scale to large numbers in response to a group membership that may be long-lived. To this end, MAD, in one embodiment, may be scalable to support a vast number of multicast groups with varying activity over time and be implemented on today's commercial hardware in an efficient and transparent manner.

MAD may utilize the following basic approach, according to an embodiment. First, MAD may separate the maintenance of multicast group membership state from the state needed for efficient forwarding of information. Multicast group membership state may be maintained scalably in a distributed fashion using a hierarchical membership tree (MT). Second, MAD may treat active multicast groups and inactive multicast groups differently based on the recognition that a predominant number of multicast groups supported by MAD are expected to be inactive at a specific instance of time. Active multicast groups may utilize IP multicast-style dissemination trees (DT) for efficient data forwarding and inactive groups may utilize membership trees for this purpose, without adversely affecting the overall forwarding efficiency. Third, MAD may seamlessly transition between use of the dissemination tree and the membership tree for forwarding of information, with no end-system (application or user) participation in the determination of responsiveness to a multicast group transitioning from an active mode to inactive mode, or vice versa.

FIG. 1 is a diagram illustrating a dissemination tree 10, according to one example embodiment. The dissemination tree 10 may be used to communicate multicast traffic for a multicast group in an active mode. The dissemination tree 10 is illustrated in the shaded nodes A, C, N, G, H, K, M, I, B and P being interconnected with communication lines to provide multicast service for a multicast group including multicast members 12, 14, 16 and 18. In one embodiment, the nodes of the dissemination tree 10 may include routers that utilize the Core Base Tree (CBT) protocol to provide the multicast service on the Internet. The multicast members 12, 14, 16, and 18 are shown to be respectively coupled to the nodes P, M, B, and H (e.g., first hop routers). Each nodes in the dissemination tree requires a minimum amount of memory to store and retrieve state. For example, the state may include interface information that identifies the communication lines over which the node may forward the multicast traffic, a topology of all of the nodes A, B, C, . . . J, K to generate an efficient dissemination tree topology, and multicast group membership information to generate the dissemination tree topology.

Responsive to multicast members subscribing and unsubscribing from a multicast group or the addition, deletion, failure, and repair of communication lines the topology of the dissemination tree may be updated to efficiently forward multicast traffic between the multicast members. Specifically, efficient forwarding on the dissemination tree may be realized by minimizing the number of hops over which multicast traffic is communicated from a source to a destination node.

The dissemination tree 10 may communicate multicast traffic (e.g., a multicast message including one or more data packets) as follows: Responsive to receipt of multicast traffic (e.g., multicast message including one or more data packets) from the multicast member 18, the node H unicasts the multicast message to the core node A. For example, the node H may use a hashing algorithm to identify the core node A based on the multicast group and unicast the multicast message. In a similar manner all nodes that transmit data in the dissemination tree may forward multicast traffic via the core node A. In response to receiving the multicast traffic, the core node A may determine the multicast group based on the message and forward the multicast traffic over the proper interfaces. For example, the core node A may forward the multicast traffic over the communication line connected to the node C which, in turn, forwards the multicast traffic over the communication line connected to the node N which, in turn, forwards the multicast traffic over the communication lines connected to the nodes M, K, and G. The process continues until all of the multicast members 12, 14, 16 and optionally, 18 receive the multicast message. In one specific example of efficient forwarding, the number of hops required for a communication from node A to node M on the dissemination tree 10 may be three (e.g., A->C, C->N, and N->M).

FIG. 2 is a diagram illustrating a physical representation of a membership tree 50, according to one example embodiment. The membership tree 50 may be used to communicate multicast traffic for a multicast group in an inactive mode. Accordingly, the multicast traffic may be communicated on the dissemination tree for a multicast group in an active mode and communicated on the membership tree for the same multicast group that has transitioned to an inactive mode. The membership tree 50 is illustrated in the shaded nodes A, M, P, B, I and H that are interconnected over one or more communication lines that may be connected via nodes to provide multicast service for a multicast group including multicast members 12, 14, 16 and 18. In one embodiment, the nodes of the membership tree 50 may include routers to provide the multicast service. The multicast members 12, 14, 16, and 18 are shown to be respectively coupled to the nodes P, M, B, and H (e.g., first hop routers). Only the nodes A and I store and retrieve state to support the multicast service on the membership tree 50, as illustrated. The two nodes required to store state on the membership tree 50 may be contrasted with the ten nodes required to store state on the dissemination tree.

The membership tree 50 may communicate multicast traffic as follows: The node H may receive multicast traffic from the multicast member 18 and unicast the multicast message to the core node A based on the multicast group. For example, a hashing algorithm may be used to identify the core node A based on the multicast group. In a similar manner all multicast traffic is routed by first hop routers through the core node A.

In response to receiving the multicast traffic, the core node A may determine the multicast group based from the multicast message and unicast the multicast message to the nodes B, H and I based on state at the node A. The nodes B and H may be first hop routers that, in turn, communicate the multicast traffic to the multicast members 16 and 18, respectively. For example, communication from the node A to the node B may follow an underlay network path that includes nodes, C, N, K, and I to be finally received by the node B. Similarly, the node I may unicast the multicast traffic to nodes M and P being first hop routers that, in turn, communicate the multicast traffic to the multicast members 14 and 12, respectively.

FIG. 3 is a diagram illustrating a logical representation of a membership tree 100, according to one example embodiment. The logical representation of the membership tree 100 corresponds to the physical representation of the membership tree 50 and may be used to illustrate underlying architecture used to operate the membership tree 50.

The membership tree 100, as previously described in FIG. 2, includes the shaded nodes A, B, H, I, M and P. The membership tree 100 is constructed from a base tree which includes all of the nodes, namely, the A, B, C, D, E, F, G, H, I, J and K nodes.

The base tree conforms to a "K-ary" tree where "K" is a system wide configurable maximum number of nodes for a level of a base tree. For example, the base tree in the FIG. 3 conforms to a K" value of eight, the node A (e.g., root node/core node) communicating to a child level of nodes including the B, C, D, E, F, G, H and I nodes but not including the remaining nodes because "K" limits the number of nodes in the child level to eight. Further the topology of the base tree includes the node I as communicating with the J, K, L, M, N, O and P nodes, thereby exhausting the identified set of nodes before exceeding the "K" value. The "K-ary" tree further has the property that a single path of nodes is traversed to reach any single node in the base tree from the core node of the base tree. The topology of the base tree remains static unless a node (e.g., router) is removed or becomes unreachable. A single base tree may be rooted at each of the nodes A, B, C, D, E, F, G, H, I, J and K. In one embodiment, a particular base tree may be utilized by one or more multicast groups respectively associated with a group identifier that hashes to the node (e.g., core router) of the base tree based on a hashing function.

A node of the base tree may become a node in the membership tree (e.g., an on-membership tree node) by servicing a local subscription or by acquisition of state. For example, the nodes B, H, M and P may be on-membership tree nodes because the nodes B, H, M and P (i.e., first hop routers) respectively service a local subscription of the multicast members 16, 18, 14, and 12. In addition, the nodes A and I may be on-membership tree nodes because the nodes A and I have acquired state used to facilitate the communication of multicast traffic over the membership tree 100.

The node A acquired state for nodes B and H based on subscriptions communicated to the core node A. In general, all multicast subscriptions serviced by a membership tree originate via a first hop router which, in turn, communicates the existence of the subscription to the core node (e.g., node A) associated with the multicast group. The existence of a subscription at a first hop router corresponds to state that may be stored by the core node (e.g., node A) or communicated by the core node to another node in the base tree. For example, the core node A stores the first hop router state for the nodes B and H. Also for example, the core node A has communicated first hop router state for the nodes M and P to the node I. The core node A may store state for a sub-tree in the base tree until a system configurable sub-tree minimum number of first hop routers is reached for the sub-tree.

In the present example, a sub-tree minimum of two has not been reached for the sub-trees under the nodes B or H. Accordingly, the core node A maintains state that identifies nodes B and H as first hop routers and, based on such information, forwards multicast traffic, that is received for the multicast group, to the nodes B and H. In contrast, the sub-tree minimum of two has been reached in the node A for the sub-tree under the node I. Accordingly, the node A registers the node I as having downstream subscribers (e.g., state) and, based on such registration, forwards multicast traffic, that is received for the multicast group, to the node I.

In the present example, the node I maintains state that identifies nodes M and P as first hop routers and, based on such information forwards multicast traffic for the multicast group that is received from the core node A, to the nodes M and P. It should be noted that the first hop sub-tree minimum of two has not been reached in node I. In general, subscription to a multicast group may cause the addition of a child node to the membership tree, the child node acquiring state from a parent node to alleviate the reaching of the sub-tree minimum in a particular sub-tree of the parent node. Further, cancelling a subscription from a multicast group may cause the removal of child node from the membership tree, the child node relinquishing state to a parent node responsive to a count of first hop routers that fails to reach the sub-tree minimum for the corresponding sub-tree of the parent node.

In summary, the above described dissemination and membership trees may be characterized with respect to forwarding and state. The dissemination tree may be said to exhibit efficient forwarding (e.g., fewer hops). For example, the number of hops required for a communication from node A to node M on the dissemination tree 10 may be three (e.g., A->C, C->N, and N->M). In contrast, the number of hops required for a communication from node A to node M on the membership tree 10 may be five (e.g., A->C, C->N, N->K, K->I and I->M). The membership tree may be said to exhibit efficient storage (e.g., less state to store). For example, the number of nodes required to store state to enable communication on the dissemination tree 10 may be ten (e.g., nodes A, C, N, K, M, G, H, I, P and B). In contrast, the number of nodes required to store state to enable communication on the membership tree 10 may be two (e.g., nodes A and I).

Figure 4:
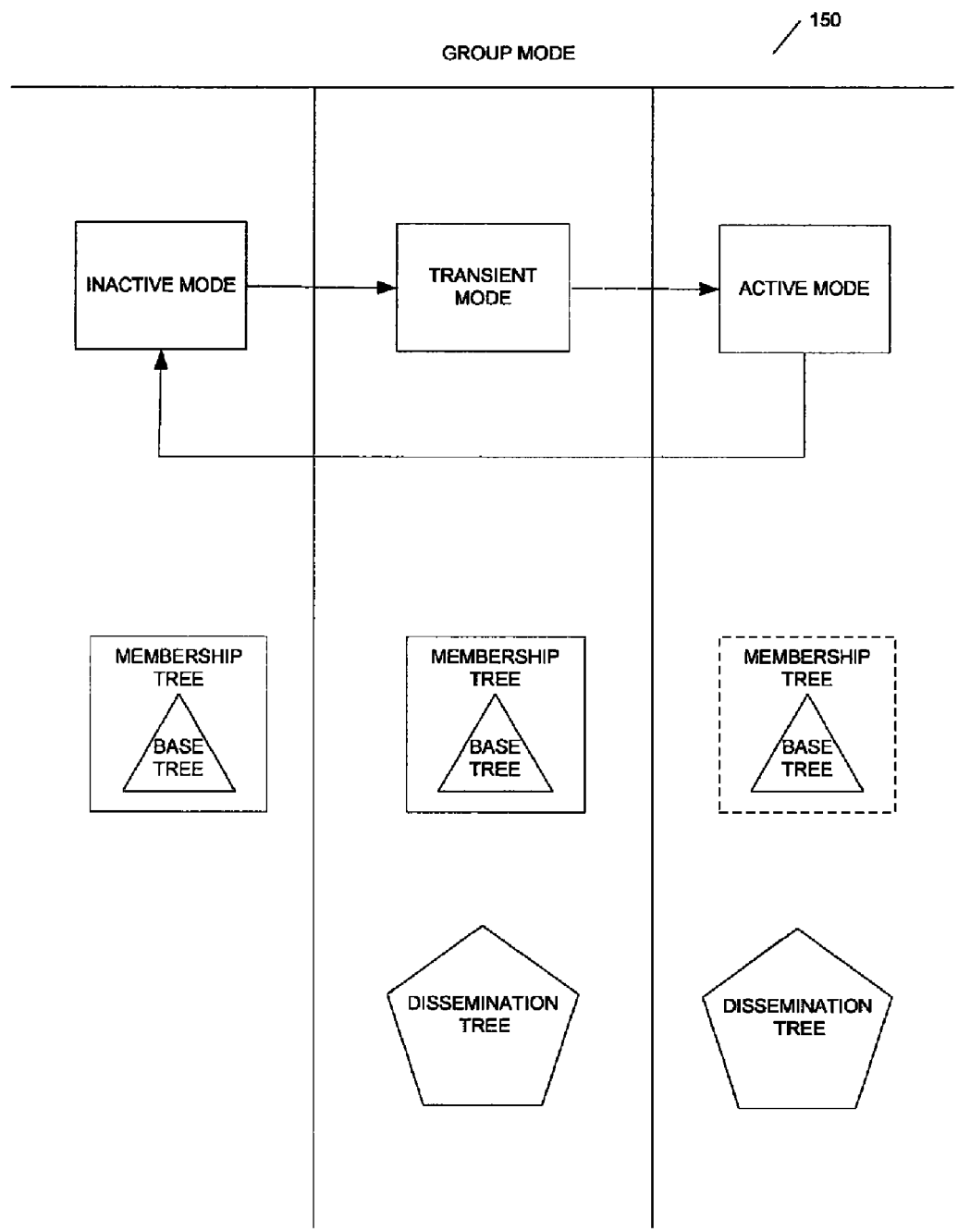
FIG. 4 is a block diagram illustrating group modes, according to an embodiment.

FIG. 4 is a block diagram illustrating multicast group modes 150, according to an embodiment. The multicast group modes 150 include an inactive mode, a transient mode, and an active mode. The core node determines the multicast group mode for the multicast group based on a rate of multicast traffic that is received by the root node for the multicast group. For example, a high rate of multicast traffic may be associated with the active mode and a low rate of multicast traffic may be associated with the inactive mode. Transitions in the rate of multicast traffic may result in the transition of the multicast group mode. Associated with each of the modes may be a base tree, a membership tree, and a dissemination tree.

The base tree is illustrated inside of the membership tree to indicate: 1) construction of the membership tree from the base tree and 2) the base tree not being stored in memory. The topology of the base tree and logical node identifiers for the nodes in the base tree may be generated, as needed, with one more routines. Specifically, a hash routine may be used to generate a logical node identifier for a core node in base tree. The hash routine may generate the logical node identifier based on a multicast group identifier that may be retrieved from a data packet. In another embodiment, the logical node identifier for the core node may be found with a lookup (e.g., table lookup) based on the multicast group identifier. The logical node identifier for the core node, once generated or identified with a look up, may be used to generate other logical node identifiers for the nodes in the base tree, as described later.

During the inactive mode the membership tree may be used to communicate the multicast traffic. The dissemination tree is deconstructed responsive to transitioning from the active mode to the inactive mode. Accordingly, the inactive mode is not associated with a dissemination tree or the state required to support the dissemination tree.

During the transient mode the membership tree and dissemination tree may be used to communicate multicast traffic.

During the active mode the dissemination tree may be used to communicate multicast traffic. The membership tree is illustrated with broken lines to signify that the membership tree continues to exist but is not used to communicate multicast traffic.

Figure 5:
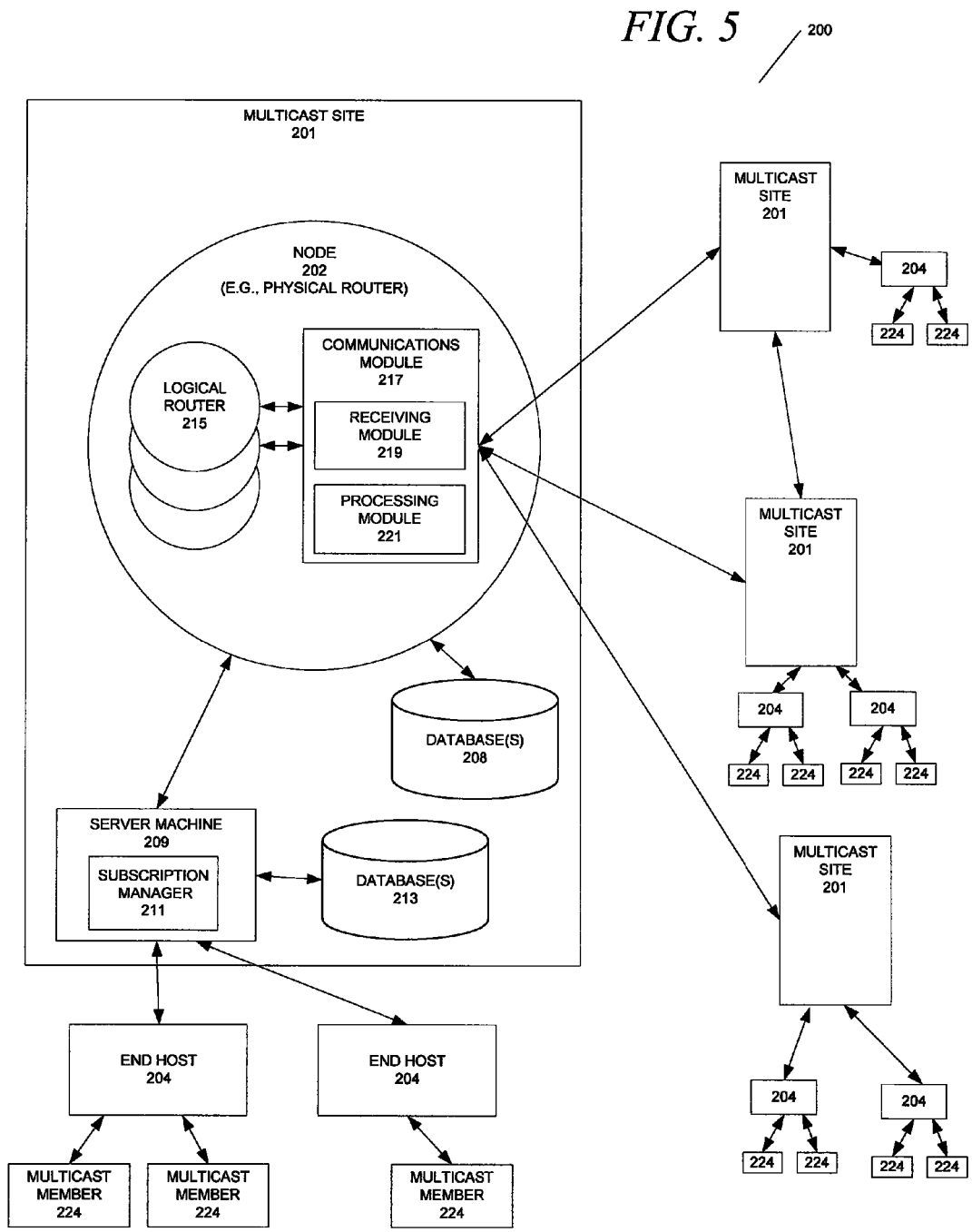
FIG. 5 is a block diagram illustrating a system, according to an embodiment.

FIG. 5 is a block diagram illustrating a system 200, according to an embodiment. The system 200 includes multiple multicast sites 201 connected together over communication lines. The communication lines may be embodied as T1 lines, wireless channels, SONET over fiber, or any other communication technology or medium that may be used to communicate data packets from a source to a destination. Each multicast site 201 is coupled to one or more end hosts 204 and includes a node 202 coupled to a database 208, and a nodes server machine 209 that is coupled to a database 213.

The node 202 may be embodied as a physical router. The node 202 may service logical routers 215 and includes a communications module 217. In response to determining a node 202 that has failed, the site 201 may respond by switching the resident logical routers 215 to another node 202 to maintain service. The communications module 217 includes a receiving module 219 and a processing module 221. The receiving module 219 may be used to receive multicast traffic from other multicast sites 201. The processing module 221 may be used to determine a rate of multicast traffic, generate a dissemination tree, and communicate the multicast traffic to multicast members via the communication lines and the nodes server machine 209. The database 208 may be used to persistently store information that is used to provide multicast services.

The server machine 209 includes a subscription manager 211 and is coupled to the database 213 and one or more end hosts 204 that, in turn, may be coupled to one or more multicast members 224 (e.g., processes or users that reside on that host). The subscription manager 211 may provide services for the multicast site 201. For example, the services may include addition of multicast members to a multicast group, removal of multicast members from a multicast group, and facilitating construction of a dissemination tree. In one embodiment the subscription manager 211 may partition subscriptions for multicast service among the logical routers 215. For example, the subscription manager 211 may initiate and cancel subscriptions with the logical routers 215 on behalf of the multicast members 224. In one embodiment, each logical router 215 may support a single aggregated local subscriber representing all multicast members 224 assigned to it by the subscription manager 211. Accordingly, each logical router 215 may denote a sink and source of multicast traffic for one multicast group.

The database 213 may be used to store multicast member information for the membership tree. For example, the multicast member information may include the multicast members 224 in association with their respective multicast groups and end hosts 204. The end host 204 may be embodied as a personal computer, a server machine, a client machine or any other device capable of communicating and receiving multicast traffic.

It will be appreciated the communication lines used to couple the nodes 202, the nodes server machine 209, the end hosts 204 and the multicast members 224 may be embodied in the same or different networks (e.g., Internet, ATM, LAN, WAN, etc.) using any technology or medium capable of communicating multicast traffic (e.g., data packets). Further, the communication lines may be embodied internal to a particular machine itself (e.g., between the end host 204 and the multicast member 224, or between the node 202 and the server machine 209, which may be different processes within a single system).

Figure 6:
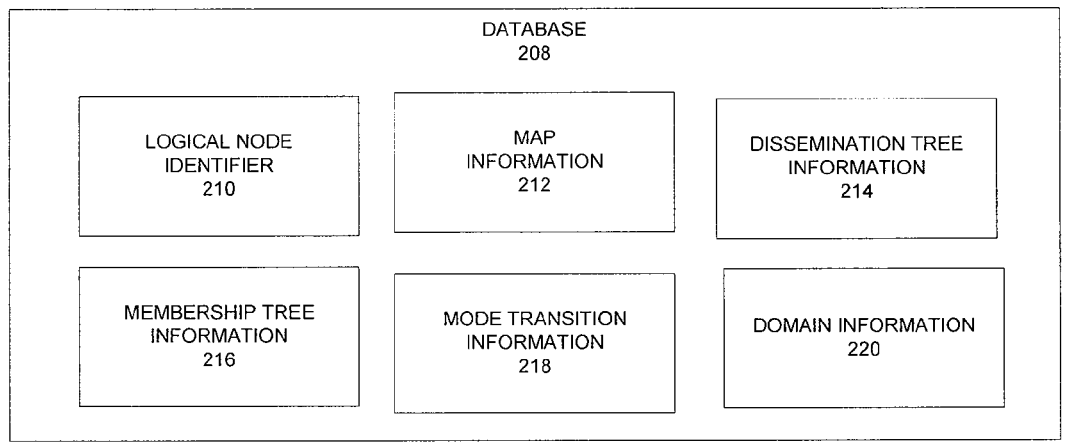
FIG. 6 is a block diagram a database, according to an embodiment.

FIG. 6 is a block diagram illustrating the database 208, according to an embodiment. The database 208 is shown to include a logical node identifier 210 that uniquely identifies the node 202, map information 212, dissemination tree information 214, membership tree information 216, mode transition information 218, and domain information 220. The map information 212 may be used to map logical node identifiers (e.g., logical router identifiers) to physical node identifiers (e.g., physical router identifiers). For example, immediately prior to communication over the communication lines the processing module 221 may map a logical node identifier to a physical node identifier. In some embodiments, the receiving module 221 may utilize the map information 212 to perform mapping services in the reverse direction The dissemination tree information 214 stores information for one or more dissemination trees of which the present node 202 may be a member node. The membership tree information 216 stores information that may be used for communicating multicast traffic over the membership tree. The mode transition information 218 may store information useful to enable the transition from the transient mode to the active mode. The domain information 220 may be used to store information that is used to communicate multicast traffic across administrative domains.

Figure 7:
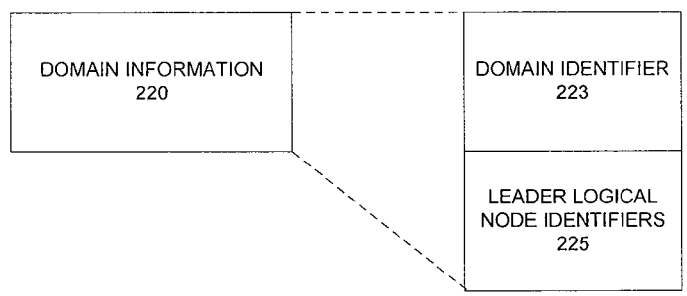
FIG. 7 is a block diagram illustrating domain information, according to an embodiment.

FIG. 7 is a block diagram illustrating domain information 220, according to an embodiment. The domain information 220 may support a MAD domain which may be used to enable the operation of MAD across administrative domains as described later. The domain information 220 includes a domain identifier 223 that identifies the MAD domain of the current node 202 and a list of leader logical node identifiers 225 for the MAD domain.

Figure 8:
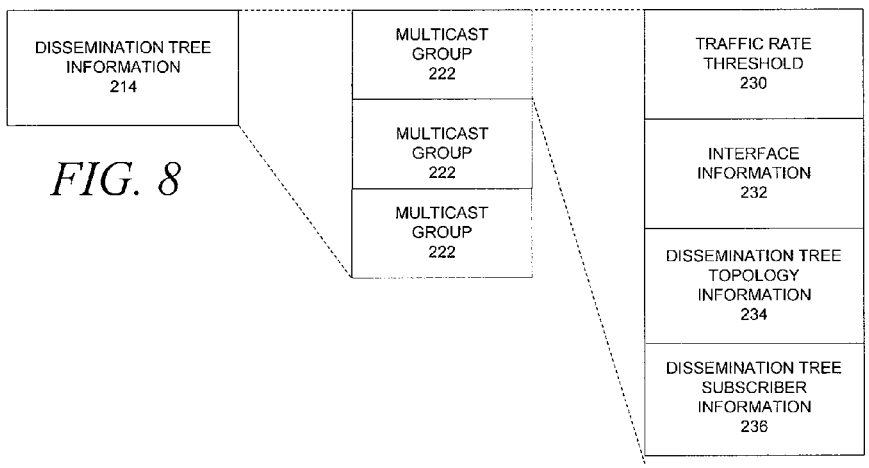
FIG. 8 is a block diagram illustrating dissemination tree information, according to an embodiment.

FIG. 8 is a block diagram illustrating dissemination tree information 214, according to an embodiment. The dissemination tree information 214 stores information for multiple multicast groups 222 each associated with one multicast group identifier and a single dissemination tree. Each multicast group 222 is further associated with storage for a traffic rate threshold 230, interface information 232 (e.g., state), dissemination tree topology information 234 (e.g., state), and dissemination tree subscriber information 236 (e.g., state). The traffic rate threshold 230 may be used by the processing module 221 to determine whether multicast traffic, being received at the node 202, exceeds a predetermined threshold (e.g., traffic rate threshold 230). In one embodiment, an administrator may increase or decrease the predetermined threshold. The multicast traffic rate may be estimated at the core node for the dissemination tree, which receives all the traffic generated for that multicast group. The traffic rate threshold 230 may, in one embodiment, be configured by an operator or administrator in a rate expressed as messages/unit time (e.g., seconds, minutes, etc.) or packets/unit time (e.g., seconds, minutes, etc.). In another embodiment, the traffic rate threshold 230 may be generated by an algorithm.

The interface information 232 may be used to identify the communication lines for forwarding of multicast traffic over the dissemination tree associated with the multicast group 222. For example, the multicast traffic received on a first communication line for a particular multicast group 222 may be forwarded out a second and third communication lines but not a fourth communication line based on the interface information 232.

In one embodiment the multicast group identifier may be designated a content descriptor. The term content descriptor may be preferable to emphasize the allocation of a distinct group based on distributable content rather than the multicast members that sink and source such distributable content. Specifically, the term content descriptor may be used to denote one or more pieces of distributable content that is distributed between a set of multicast members. In one embodiment, the multicast group identifier may be obtained from the content descriptor by using a hash. Alternatively, a node identifier of a core node of a membership tree or dissemination tree associated with the content descriptor may be obtained by a hash of the content descriptor.

The dissemination tree topology information 234 may be used to store a topology of nodes 202 to construct the dissemination tree. The dissemination tree subscriber information 236 may be used to identify nodes 202 (e.g., first hop router) in the system 200 that are locally connected to multicast members and provide multicast service for the locally connected multicast members. In one embodiment, the dissemination tree may be constructed and maintained using the Core Based Tree (CBT) protocol.

Maintenance of the interface information 232 is based on the dissemination tree topology information 234 which is based on the dissemination tree subscriber information 236. Accordingly, the addition of dissemination tree subscriber information (e.g., adding a multicast member 224) or deletion of dissemination tree subscriber information 236 (e.g., deleting a multicast member 224) may trigger updating of the dissemination tree topology information 234 which, in turn, may trigger updating of the interface information 232. Similarly, a communication line that has failed may trigger updating of the dissemination tree topology information 234 and the interface information 232 to facilitate the forwarding of multicast traffic around the failed communication line.

Figure 9:
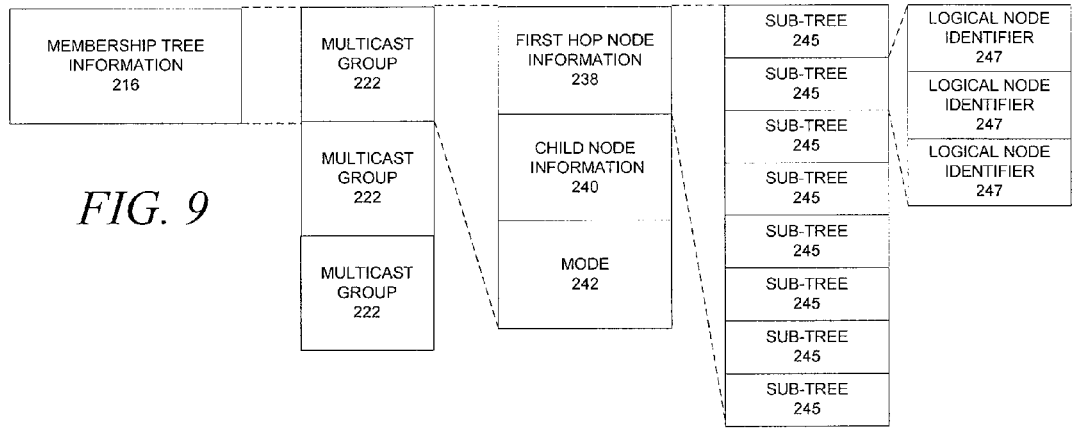
FIG. 9 is a block diagram illustrating membership tree information, according to an embodiment.

FIG. 9 is a block diagram illustrating membership tree information 216, according to an embodiment. The membership tree information 216 is shown to store information for one multicast group 222. There is a separate membership tree for each multicast group 222. The membership tree for each multicast group 222 is rooted at a distinct node 202, and the membership tree is for that multicast group 222. Each multicast group 222 may be associated with first hop node information 238 (e.g., first hop router), child node information 240, and a mode 242.

The first hop node information 238 may be used to identify logical routers 215 that map to nodes 202 that provide multicast service to locally connected (e.g., via the nodes server machine 209 and end host 204) multicast members 224. The first hop node information 238 may be organized according to sub-trees 245 in the base tree that respectively correspond to child nodes 202 of the present node 202 in the base tree. The number of sub-trees 245 may be bounded by the "K," the value used to define the base tree topology, as described above. Each sub-tree 245 may be associated with a list of one or more logical node identifiers 247 (e.g., logical router identifier) each of which satisfy the following: 1) the identified logical router 215 is associated with at least one local multicast member(s) 224 that is a subscriber to the associated multicast group 222; and, 2) the identified logical router 215 is located above (e.g., towards the leaf nodes and away from the core node) the present node 202 in the base tree. As illustrated, the present node 202 is storing first hop node information 238 for the second sub-tree in the membership tree below the present node 202. The first hop node information 238 may further include a logical node identifier for the present node to trigger local forwarding (e.g., within the multicast site 201) of multicast traffic for the multicast group 222 to the subscription manager 211.

The child node information 240 may identify child nodes 202 of the present node that have downstream subscribers (e.g., state). The child node information 240 may be embodied in a bit map bounded by "K" bits that respectively correspond to child nodes 202 in the topology of the base tree that are serviced by the present node 202, an asserted bit representing an "on-membership-tree" node 202 that has downstream subscribers. Accordingly, the first hop node information 238 and child node information 240 may be used to forward multicast traffic on the membership tree. For example, a node 202 that receives multicast traffic may forward the multicast traffic by unicasting the multicast traffic to the nodes 202 identified by the first hop node information 238 and the child node information 240. The first hop node information 238 and the child node information 240 may be collectively referred to as membership tree state.

The mode 242 may identify the mode of the multicast group 222 (e.g., inactive, transient, active).

Figure 10:
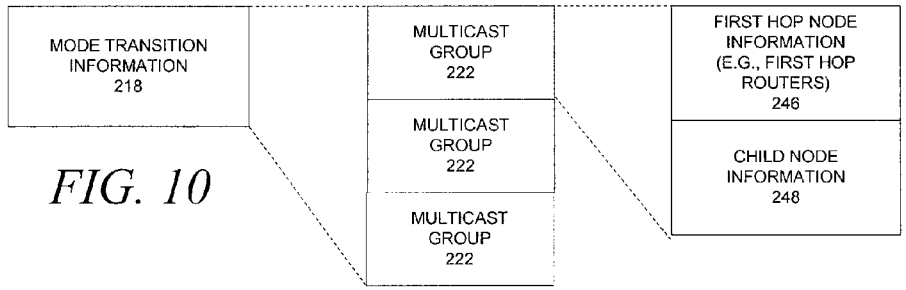
FIG. 10 is a block diagram illustrating mode transition information, according to an embodiment.

FIG. 10 is a block diagram illustrating mode transition information 218, according to an embodiment. The mode transition information 218 includes storage for multiple multicast groups 222. Each multicast group 222 may be associated with first hop node information 246 and child node information 248. The first hop node information 238 and the child node information 248 may be used during the transition mode for forwarding on the membership tree, as described above. For example, logical node identifiers 247 may be cleared from the first hop node information 246 and bits may be cleared in the child node information 248 responsive to a determination that such nodes may successfully receive multicast traffic over the dissemination tree. Accordingly, multicast traffic on the membership tree may be diminished in proportion to a determination of successful multicasting over the dissemination tree according to the mode transition information 218.

Figure 11:
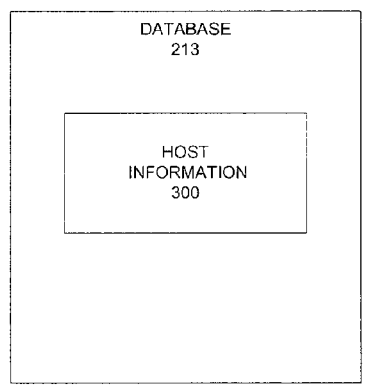
FIG. 11 is a block diagram illustrating a database, according to an embodiment.

FIG. 11 is a block diagram illustrating a database 213, according to an embodiment. The database 213 stores host information 300.

Figure 12:
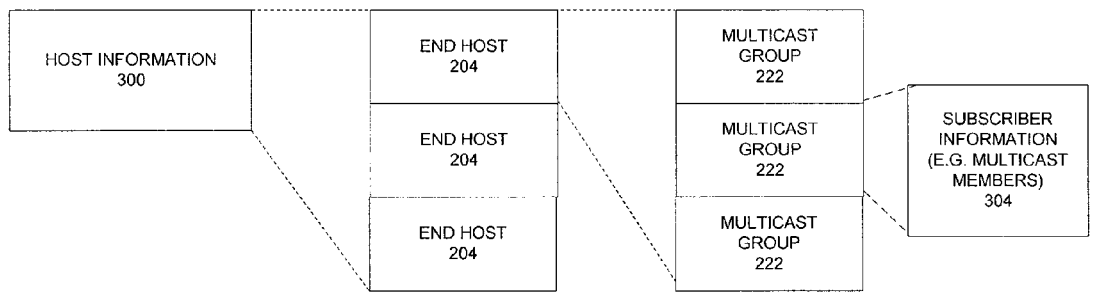
FIG. 12 is a block diagram illustrating host information, according to an embodiment.

FIG. 12 is a block diagram illustrating the host information 300, according to an embodiment. The host information 300 stores information for multiple end hosts 204. Each end host 204 may be associated with multiple multicast groups 222 that respectively store subscriber information 304. For example, the subscriber information 304 may include multicast member identifiers respectively associated with multicast members 224 that are connected to a particular end host 204.

Figure 13:
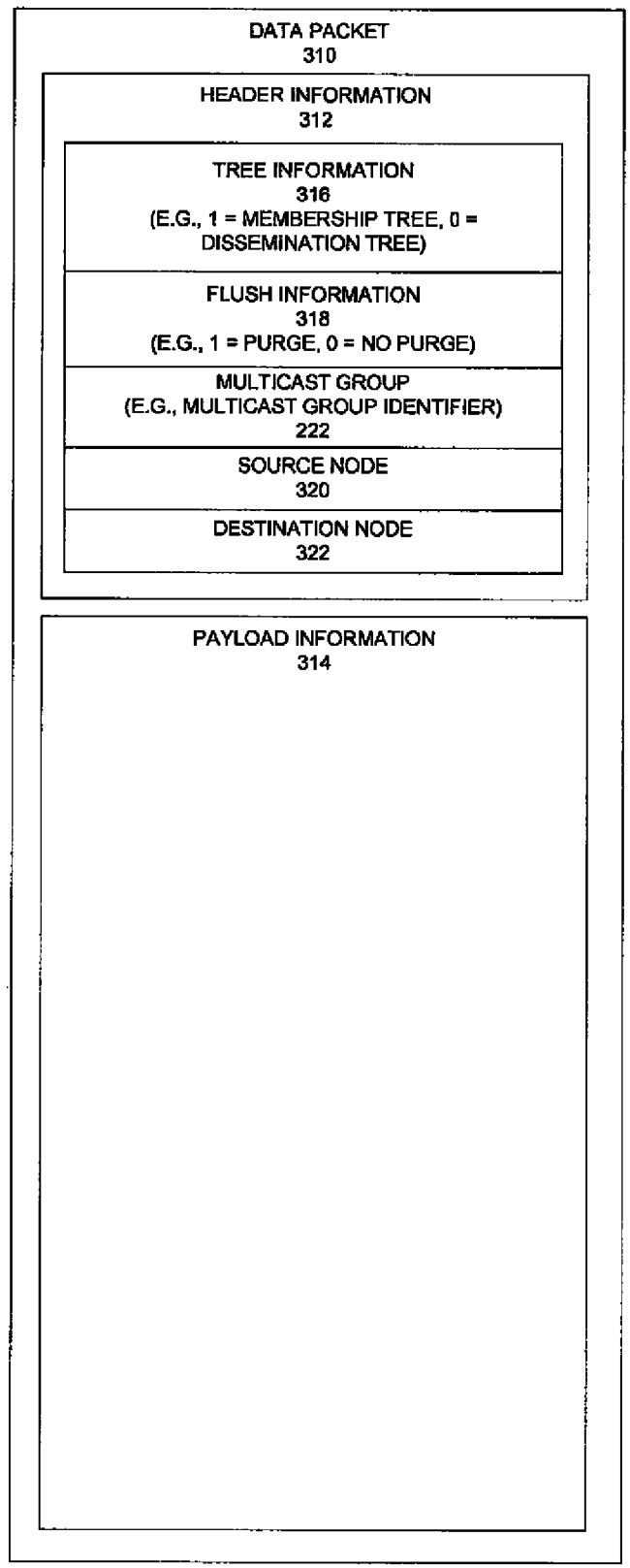
FIG. 13 is a block diagram illustrating a data packet, according to an embodiment.

FIG. 13 is a block diagram illustrating a data packet 310, according to an embodiment. One or more data packets 310 may be communicated as a multicast message (e.g., multicast traffic). The data packet 310 includes header information 312 and payload information 314. The header information 312 includes tree information 316, flush information 318, a multicast group 222, a source node 320 (e.g., physical node identifier), and a destination node 322 (e.g., physical node identifier). The tree information 316 may be used to identify the tree on which the data packet 310 is received. For example, an asserted value may indicate the data packet 310 has been received on the membership tree and a non-asserted value may indicate the data packet 310 has been received on the dissemination tree (and therefore has to be forwarded on the corresponding tree). The flush information 318 may be asserted to force a purging of the dissemination tree state at a node 202 that receives the data packet 310. For example, in transitioning from the active to the inactive mode an asserted value may force the node 202 to purge dissemination tree state associated with the multicast group 222 specified in the data packet 310. The multicast group 222 may be a multicast group identifier. The destination node 322 may identify the destination node 202 of a unicasted data packet 310. The source node 320 may be used to identify the node 202 that originated the data packet 310. The payload information 314 may include logical node identifiers 247, multicast group identifiers, and other information as required to support the methods described below.

Figure 14:
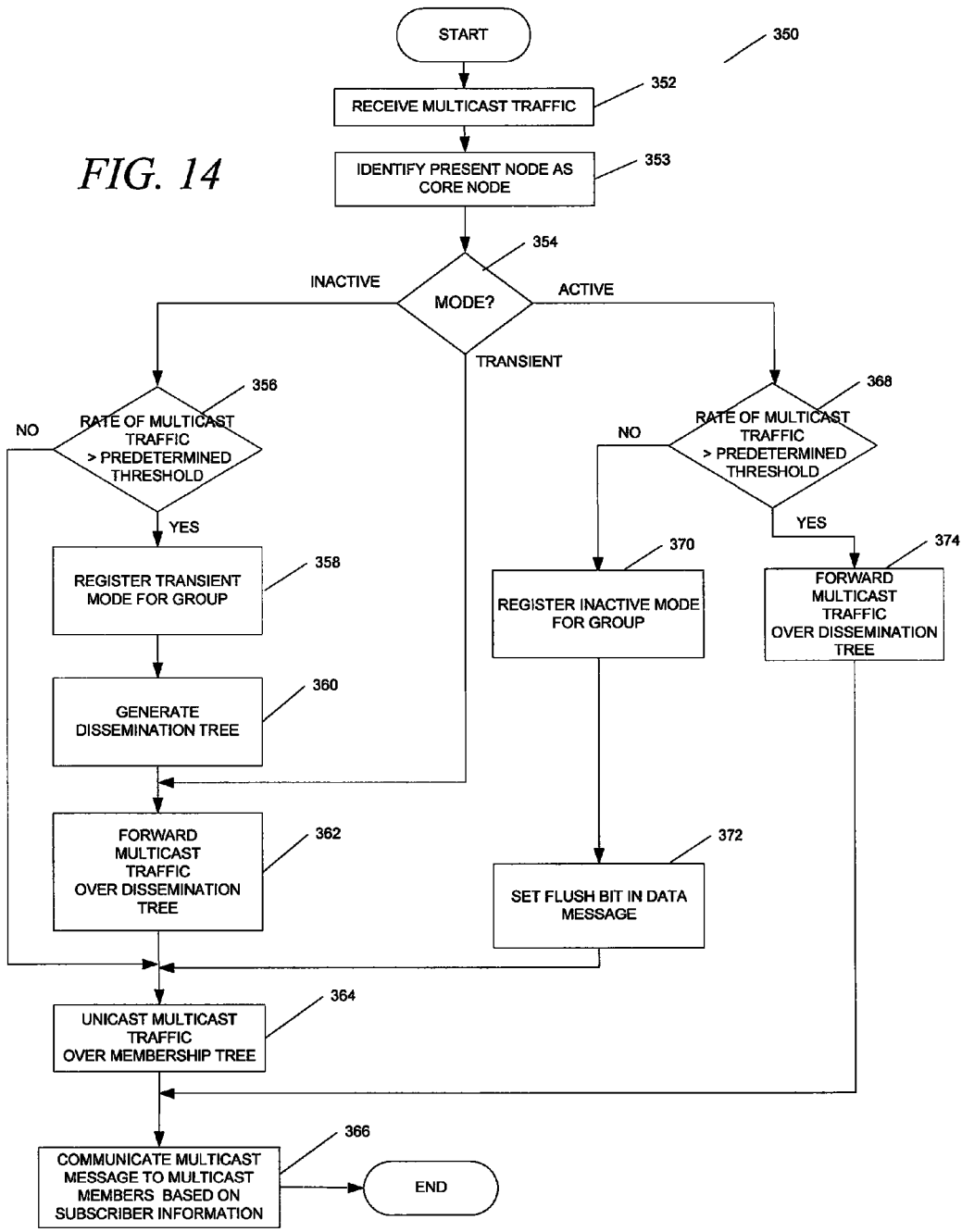
FIG. 14 is a flow chart illustrating a method, according to an embodiment, to receive and process multicast traffic.

FIG. 14 is a flow chart illustrating a method 350, according to an embodiment to receive and process multicast traffic at a core node (e.g., node 202). The method 350 commences at operation 352 with the receiving module 219 receiving multicast traffic in the form of a data packet 310. The processing module 221 reads the header information 312 from the data packet 310 including a multicast group identifier.

At operation 353, the processing module 221 may identify the present node as the core node for the multicast group 222. For example, the processing module 221 may generate a logical node identifier 247 by applying a hash function to the multicast group identifier retrieved from the data packet 310. Next, the processing module 221 may compare the generated logical node identifier 247 to the logical node identifier 210 of the present node 202 to identify whether the identifiers match. Specifically, matching identifiers indicates the present node is the core node 202 for the multicast group 222.

At decision operation 354, the processing module 221 determines the mode 250 of the multicast group 222. If the mode is inactive, the processing module 221 branches to decision operation 356. If the mode is active, the processing module 221 branches to decision operation 368. If the mode is transient, the processing module 221 branches to operation 362.

At decision operation 356, the processing module 221 compares the rate of the multicast traffic to a predetermined threshold. In one embodiment, the predetermined threshold may be the traffic rate threshold 230 for the multicast group 222. If the rate of multicast traffic is greater than the predetermined threshold, then a branch is made to operation 358. Otherwise, a branch is made to operation 364.

At operation 358, the processing module 221 registers the multicast group 222 in the transient mode. At operation 360, the processing module 221 generates the dissemination tree. At operation 362, the processing module 221 forwards the multicast traffic (e.g., data packet 310) over the dissemination tree. At operation 364, the processing module 221 unicasts the multicast traffic (e.g., data packet 310) over the membership tree.

At operation 366, the node 202 determines whether the data packet 310 is destined for a locally connected multicast member 224. For example, the node 202 may communicate the data packet 310 via the server machine 209 to the appropriate end host 204 to the identified multicast members 224.

Assuming the mode is active, the processing may continue at decision operation 368 with the processing module 221 determining whether the rate of multicast traffic is greater than the predetermined threshold. In one embodiment, the predetermined threshold may be the traffic rate threshold 230 that has been configured for the present multicast group 222. If the rate of multicast traffic is greater than the predetermined threshold, then processing continues at operation 374. Otherwise, processing continues at operation 370.

At operation 370, the processing module 221 registers an inactive mode for the multicast group 222. At operation 372, the processing module 221 asserts the flush bit (e.g., flush information 318) in the data packet 310. At operation 374, the processing module 221 forwards the multicast traffic (e.g., the data packet 310) over the dissemination tree.

Figure 15:
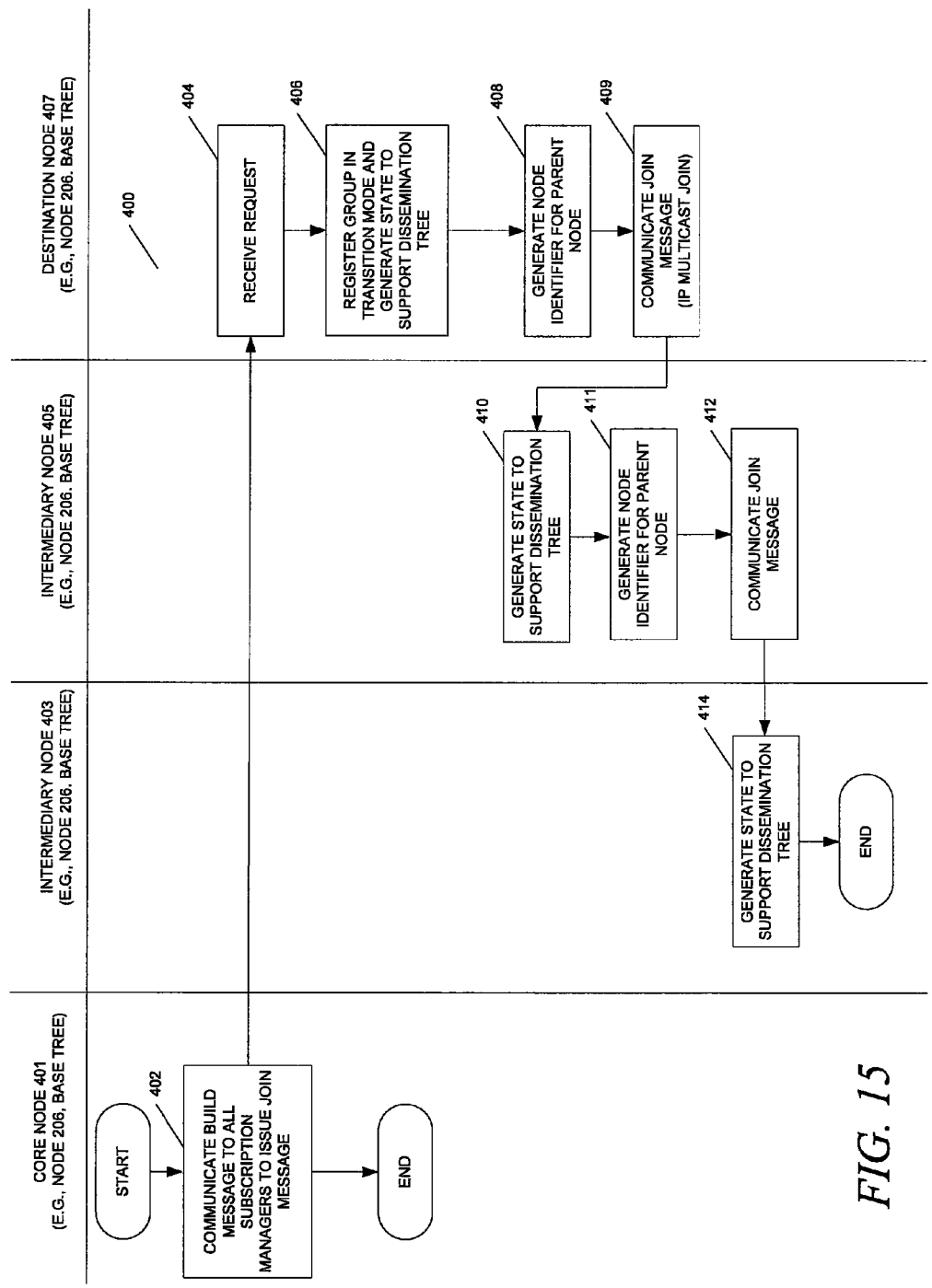
FIG. 15 is a flow chart illustrating a method, according to an embodiment, to generate a dissemination tree.

FIG. 15 is a flow chart illustrating a method 400, according to an embodiment, to generate a dissemination tree. The method 400 corresponds to the operation 360 on the FIG. 14. Illustrated on the far left is a core node 401 and illustrated on the far right is a destination node 407. Illustrated on the middle left is an intermediary node 202 and illustrated on the middle right is an intermediary node 202. The nodes 405 and 403 represent the shortest path on the base tree from the destination node 407 to the core node 401. The core node 401, intermediary node 403, intermediary node 405, and destination node 407 respectively correspond to deeper levels in the base tree.

At operation 402, the core node 401 responds to a transition to the transient mode by communicating a build message to all subscription managers 211 in the multicast group 222. For clarity, the communication and processing of a single build message is illustrated, however, substantially similar operations are performed by the core node 401 for each of the subscription managers 211 in the multicast group 222. In one embodiment, the core node 401 may unicast the build message to the destination node 407.

At operation 404, the receiving module 219, at the destination node 407, receives the build message and at operation 406, the processing module 221 registers the multicast group 222 in the transition mode by updating the mode 242 and by generating state to support the dissemination tree. For example, the processing module 221 may generate state by retrieving subscriber information 304 from the database 213 and storing the retrieved information as dissemination tree subscriber information 236 in the memory of the node 202. In addition, the processing module 221 may use the dissemination tree subscriber information 236 to generate the dissemination tree topology information 234 and the interface information 232.

At operation 408, the processing module 221 identifies a parent node in the base tree. For example, the processing module 221 may generate a logical node identifier for the intermediary node 405 (e.g., parent node in base tree) based on the multicast group identifier in the data packet 310 as described later.

At operation 409, the processing module 221 at the destination node 407 communicates the join message (e.g., Internet Protocol Multicast Join) to the intermediary node 405. At operation 410, the intermediary node 405 receives the join message and generates state to support the dissemination tree as previously described. At operation 411, the processing module 221 identifies a parent node in the base tree. For example, the processing module 221 may generate a logical node identifier 247 for the intermediary node 403 (e.g., parent node in base tree) based on the multicast group identifier in the data packet 310 as described later. At operation 412, the intermediary node 205 communicates the join message to the intermediary node 403 which is a parent of the intermediary node 405 in the base tree and the shortest path to the core node 401. At operation 414, the intermediary node 403 receives the join message and generates state to support dissemination tree, as previously described.

Figure 16:
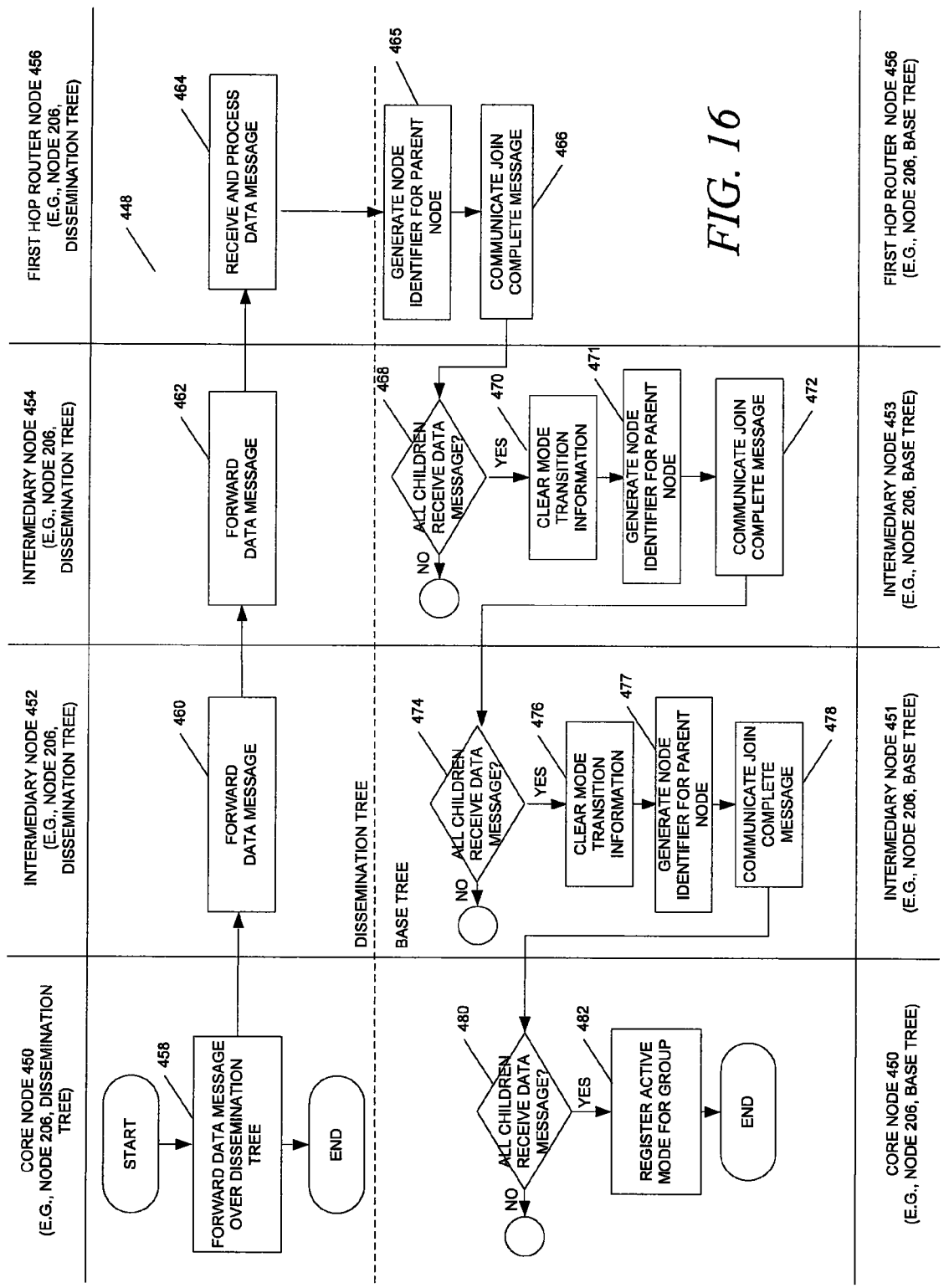
FIG. 16 is a flow chart illustrating a method, according to an embodiment, to forward multicast traffic over a dissemination tree during transition mode.

FIG. 16 is a flowchart illustrating a method 448, according to an embodiment, to forward multicast traffic over a dissemination tree for a multicast group 222 in the transient mode. The method 448 corresponds to the operation 362 on the FIG. 14. Illustrated on the far left is a core node 450 and illustrated on the far right is a first hop router node 456. Illustrated on the middle left is an intermediary node 452 and on the middle right is an intermediary node 454. The nodes 450, 452, 454 and 456 are part of a topology of a dissemination tree. Operations performed above the broken line are performed on the dissemination tree and operations performed below the broken line are performed on the base tree.

The method 448 commences at operation 458, with the processing module 221 forwarding the data packet 310 over the dissemination tree for the multicast group 222 in the transition mode. In one embodiment, the data packet 310 may store tree information 316 that is asserted to identify the packet as communicated on the dissemination tree. At operation 460, the intermediary node 452 receives the data packet 310 and forwards the data packet 310 to intermediary node 454 (operation 462) that forwards of the data packet 310 to the first hop router node 456. For the sake of clarity a single path on the dissemination tree is illustrated; however, it will be appreciated that the same operation may be repeated to forward the data packet 310 to all first hop routers on the dissemination tree.

At operation 464, the receiving module 219 at the first hop router node 456 receives the data packet 310 and the processing module 221 communicates the data packet 310, via the nodes server machine 209 and end hosts 204, to multicast members 224.

At operation 465, the processing module 221 identifies a parent node in the base tree. For example, the processing module 221 may generate a logical node identifier for the intermediary node 453 (e.g., parent node in base tree). The node identifier may be generated based on the multicast group identifier in the data packet 310 as described later.

At operation 466, the processing module 221 determines the multicast group 222 to be in the transition mode and the data packet 310 as received on the dissemination tree. For example, the processing module 221 may determine the multicast group 222 to be in the transition mode based on the mode 242. Further, for example, the processing module 221 may determine the data packet 310 as received on the dissemination tree based on the tree information 316 in the data packet 310. Next, the processing module 221 may communicate a join complete message to the parent node, intermediary node 453 on the base tree, indicating that multicast traffic (e.g., data packet 310) has been successfully received on the dissemination tree. The join complete message may include a multicast group identifier.

At decision operation 468, the intermediary node 453 receives the join complete message and the processing module 221 determines whether all children nodes 202 have successfully received multicast traffic on the dissemination tree. For example, the processing module 221 may determine whether a join complete message has been received by the intermediary node 453 from all children nodes 202 in the base tree associated with the multicast group 222. If the processing module determines a join complete message has been received by the intermediary node 453 from all children nodes 202, a branch is made to operation 470. Otherwise processing ends.

At operation 470, the processing module 221 clears the mode transition information 218 for the multicast group 222. For example, the processing module 221 may clear first hop node information 246 and child node information 248. At operation 471, the processing module 221 identifies a parent node in the base tree. For example, the processing module 221 may generate a logical node identifier 247 for the intermediary node 452 (e.g., parent node in base tree). The logical node identifier 247 may be generated based on the multicast group identifier in the data packet 310 using a hash. At operation 472, the processing module 221 communicates the join complete message to the intermediary node 451, the parent node in the base tree of the intermediary node 453.

At the intermediary node 451 the decision operation 474, the operation 476, the operation 477 and the operation 478 are respectively performed in like manner as the decision operation 468, the operation 470, and the operation 472.

At decision operation 480, at the core node 450, the receiving module 219 receives the join complete message and the processing module 221 determines whether the core node 450 has received a join complete message from all children nodes 202 in the multicast group 222 in the base tree. If the processing module 221 determines a join complete message has been received from all children nodes 202 then the multicast group 222 is registered in the active mode (e.g., mode 242). Otherwise processing ends.

Figure 17:
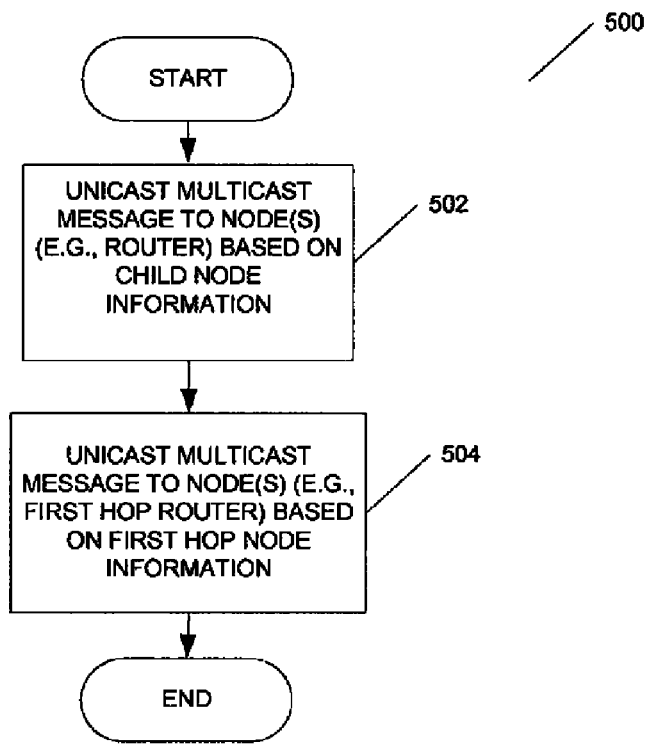
FIG. 17 is a flow chart illustrating a method, according to an embodiment, to communicate multicast traffic over a membership tree during an inactive or transient mode.

FIG. 17 is a flowchart illustrating a method 500, according to an embodiment, to communicate multicast traffic over a membership tree. The method 500 corresponds to operation 364 on the FIG. 14. At operation 502, the processing module 221 may unicast the multicast message (e.g., data packet(s) 310) to nodes 202 on the membership tree (e.g., on-membership tree nodes) based on the child node information 240 associated with a multicast group 222. For example, the processing module 221 may utilize the map information 212 to map the logical node identifiers 247 to physical node identifiers to unicast the multicast message.

At operation 504, the processing module 221 may unicast the multicast message (e.g., data packet(s) 310) to nodes 202 in the membership tree (e.g., on-membership tree nodes) based on the first hop node information 238 associated with the multicast group 222. For example, the processing module 221 may unicast the multicast message based on the logical node identifiers 247 in the first hop node information 238.

The processing module 221 performs the above operations for a multicast group 222 that is registered in the inactive mode or the transient mode. The processing module 221 does not unicast messages on the membership tree for a group that is registered in the active mode. In the inactive mode, the processing module 221 uses the first hop node information 238 and the child node information 240 from the membership tree information 216 to identify destination nodes. In the transient mode, the processing module 221 uses the first hop node information 238 and the child node information 240 from the node transition information 218 to identify destination nodes.

Figure 18:
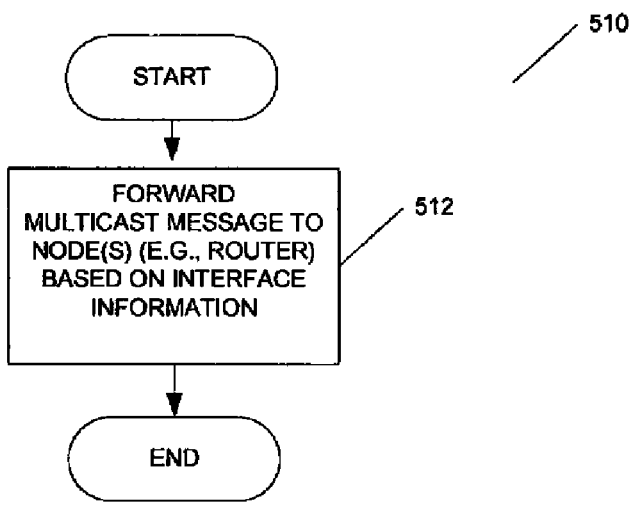
FIG. 18 is a flow chart illustrating a method, according to an embodiment, to forward multicast traffic over a dissemination tree.

FIG. 18 is a flowchart illustrating a method 510, according to an embodiment, to forward traffic over a dissemination tree. The method 510 corresponds to operations 362 and 374 on the FIG. 14. The method 510 commences at operation 512 with the processing module 221 forwards the multicast message (e.g., data packet(s) 310) to nodes 202 on the dissemination tree. For example, the processing module may forward the multicast traffic based on the interface information 232 for the multicast group 222.

Figure 19:
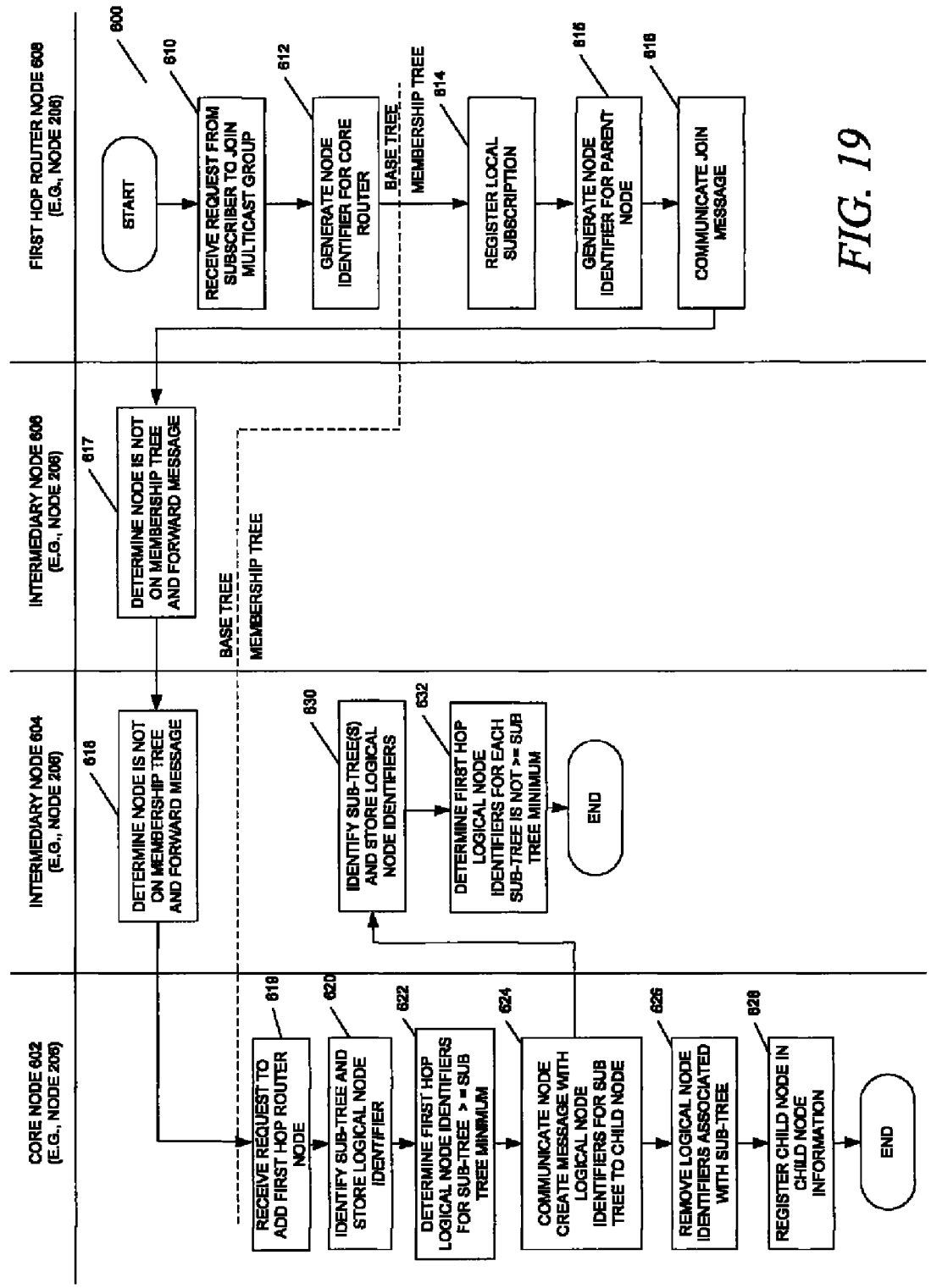
FIG. 19 is a flow chart illustrating a method, according to an embodiment, to store state used to forward multicast traffic.

FIG. 19 is a flowchart illustrating a method 600, according to an embodiment, to store state used to forward multicast traffic. Illustrated on the far left is a core node 602 and illustrated on the far right is a first hop router node 608. Illustrated on the middle left is an intermediary node 604 and illustrated the middle right is an intermediary node 606. Operations illustrated above the dashed line are performed by the nodes 604, 606 and 608 in the base tree for the multicast group 222 and operations performed below the dashed line are performed by the nodes 602, 604 and 608 in the membership tree for the multicast group 222. The intermediary node 604 and the first hop router node 608 are registered on the membership tree (e.g., on-membership tree nodes), as described below.

At operation 610, at the first hop router node 608, the receiving module 219 receives a request from a multicast member (e.g., subscriber) to join a multicast group 222. For example, the request may be communicated to the receiving module 219 from the subscription manager 211 on the nodes server machine 209. At operation 612, the processing module 221 generates a logical node identifier 247 for the core node 602 (e.g., core router) based on a multicast group identifier associated with the multicast group. For example, the processing module 221 may use a hash routine to generate the logical node identifier 247 for the core node 602 based on the multicast group identifier. At operation 614, the processing module 221 registers a local subscription for the multicast group 222 on a logical router 215 making the first hop router node 608 an on-membership tree node. For example, the logical node identifier 247 for the first hop router node 608 may be stored in the first hop node information 238 at the first hop router node 608.

At operation 615, the processing module 221 identifies a parent node in the base tree. For example, the processing module 221 may generate a logical node identifier 247 for the intermediary node 606 (e.g., parent node in base tree). At operation 616, the processing module 221 unicasts a join message (e.g., add node) to the intermediary node 606, the parent node of the first hop router node 608 in the base tree. The join message may include the multicast group identifier associated with the multicast group 222 and the logical node identifier 247 associated with the first hop router node 608.

At operation 617, at node 606, the receiving module 219 receives the join message. In addition, the processing module 221 determines the intermediary node 606 is not on the membership tree and, responsive to the determination, generates a logical node identifier for the intermediary node 604 (e.g., parent node in base tree) and forwards the join message up the base tree to the intermediary node 604.

At operation 618, at node 604, the receiving module 219 receives the join message. In addition, the processing module 221 determines the intermediary node 606 is not on the membership tree and, responsive to the determination, generates a logical node identifier for the core node 602 (e.g., parent node in base tree) and forwards the data message up the base tree to the core node 602.

At operation 619, at the core node 602, the receiving module 219 receives a request (e.g., join message) from the intermediary node 604 to add a first node in the form of the first hop router node 608 to the multicast group 222. Next, the processing module 221 identifies the present node (e.g., core node 602) as the core node for the multicast group 222, as previously described in operation 353 on FIG. 14.

At operation 620, the processing module 221 identifies the appropriate sub-tree 245 in the base tree for the multicast group 222, as described further later. Next, the processing module 221 stores the logical node identifier 247 for the first hop router node 608 to the list that corresponds to the identified sub-tree 245.

At operation 622, the processing module 221 determines whether the number of logical routers 215 in the identified sub-tree 245 is greater or equal to a predetermined threshold in the form of a sub-tree minimum for the system 200. In the present example, the sub-tree minimum is reached. Accordingly, at operation 624, the processing module 221 communicates a node create message to the intermediary node 604 (e.g., node 202) in the base tree (e.g., child node) that corresponds to and provides access to the identified sub-tree 245. For example, the node create message may include all logical node identifiers 247 for the identified sub-tree 245 for the identified multicast group 222

At operation 626, the processing module 221 removes the logical node identifiers 247 (e.g., state) for the identified sub-tree 245 for the multicast group 222 from the first hop node information 238. At operation 628, the processing module 221 registers the intermediary node 604 in the child node information 240 as having downstream subscribers (e.g., state).

At operation 630, at intermediary node 604, the receiving module 219 receives the node create message and the processing module 221 stores the logical node identifiers 247 according to the appropriate sub-trees 245 in the first hop node information 246 at intermediary node 604. For example, the intermediary node 604 may identify the appropriate sub-trees in the base tree for the multicast group for each of the logical router identifiers 247, as described later. Further for example, the processing module 221 may store the logical node identifiers 247 in first hop node information 246 according to sub-trees that may be respectively associated with eight children nodes in a k-ary base tree (e.g., where k is equal to eight, the intermediary node 606 being one of the children nodes). It will be appreciated that the logical node identifiers 247 communicated in the node create message and formerly stored according to a single sub-tree 245 from the perspective of core node 602 may now be stored according to multiple sub-trees 245 from the perspective of intermediary node 604.

At operation 632, the processing module 221 compares the number of logical node identifiers 247 associated with each of the sub-trees 245 to the sub-tree minimum for the system and determines that none of the sub-trees 245 are associated with a number of logical node identifiers 247 that have exceeded the sub-tree minimum for the system and processing ends.

The present example illustrates the addition of the logical node identifiers 247 to multiple sub-trees 245 at the intermediary node 604. Accordingly, the sub-tree minimum is not exceeded and the processing ends. Another example may illustrate an addition of the logical node identifiers 247 to a sub-tree such that the number of logical node identifiers 247 for the sub-tree is greater or equal to the sub-tree minimum. In the latter case additional nodes would be added to the membership tree (e.g., on-membership tree nodes) until the added logical node identifiers 247 are distributed over sub-trees 245 in a manner that prevents reaching the sub-tree minimum for any sub-tree 245. Responsive to the distribution of the logical node identifiers 247 in a manner that prevents reaching the sub-tree minimum for any sub-tree 245, the processing module 221 would no longer add a node 202 to the membership tree and processing would end.

Figure 20:
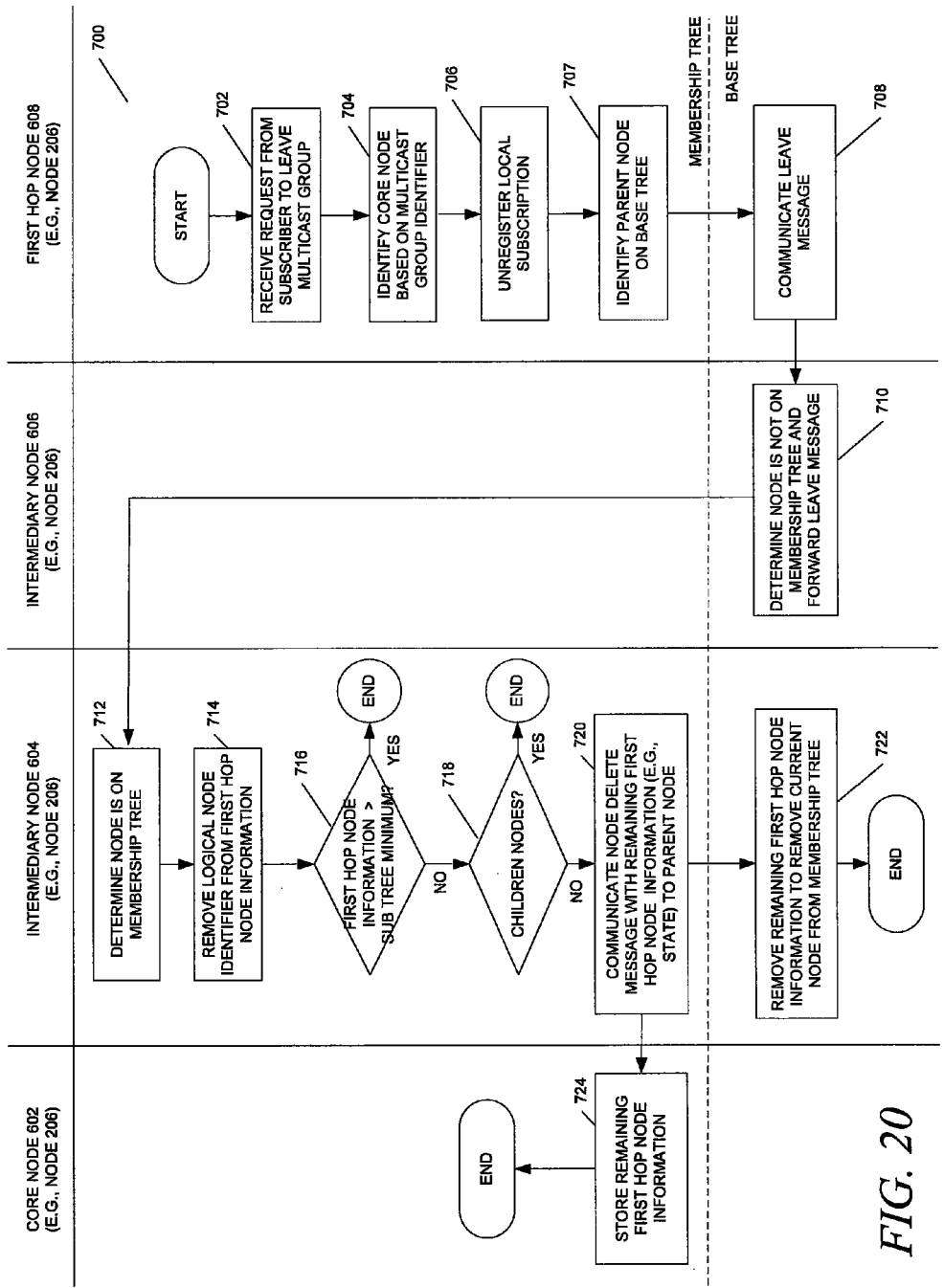
FIG. 20 is a flow chart illustrating a method, according to an embodiment, to store state used to forward multicast traffic.

FIG. 20 is a flowchart illustrating a method 700, according to an embodiment, to store state used to forward multicast traffic. Illustrated on the far left is a core node 602 and illustrated on the far right is a first hop router node 608. Illustrated on the center left is an intermediary node 604 and illustrated on the center right is an intermediary node 606. Operations performed above the broken line are performed on the membership tree and operations performed below the broken line are performed on the base tree.

At operation 702, the receiving module 298 receives a request from the subscription manager 211, via the nodes server machine 209, that a multicast member (e.g., subscriber) is leaving a multicast group 222. At operation 704, the processing module 221 identifies the core node 602 for the multicast group based on multicast group identifier. At operation 706, the processing module 221 removes the local subscription. In the present example, the local subscription is the last subscription of the multicast group 222 and the first hop node 608 no longer provides service for the multicast group 222 on the logical router 215. Accordingly, the first hop node 608 is removed from the membership tree associated with the multicast group. For example, the logical node identifier 247 for the first hop node 608 may be removed from the first hop node information 246 at the first hop node 608. At operation 707, the processing module 221 identifies the parent node on the base tree associated with the multicast group. At operation 708, the processing module 221 communicates a leave message to the intermediary node 606, the parent node of the first hop node 608 (e.g., node 202) on the base tree. The leave message may include the logical node identifier 247 to be removed and a multicast identifier associated with the multicast group.

At operation 710, the receiving module 219, at the intermediary node 606 receives the leave message and determines the intermediary node 606 is not on the membership tree and, responsive to the determination, communicates the leave message to the intermediary node 604, the parent node of the intermediary node 606 (e.g., node 202) on the base tree.

At operation 712, at the intermediary node 604, the receiving module 219 receives the leave message and the processing module 221 determines the intermediary node 604 is on the membership tree. At operation 714, the processing module 221 may remove the logical node identifier 247 corresponding to the first hop node 608.

At decision operation 716, the processing module 221 determines whether the number of logical router identifiers 247 in the first hop node information 238 is greater than the sub-tree minimum. Specifically, all of the logical node identifiers 247 in the first hop node information 238 are counted irrespective of sub-trees 245 and compared to the sub-tree minimum. If the sum of logical node identifiers 247 is greater than the sub-tree minimum, processing ends. Otherwise a branch is made to decision operation 718.

At decision operation 718, the processing module 221 determines whether any nodes 202 (e.g., children nodes in the base tree) are registered as child node information 240 for the multicast group 222. If one or more nodes 202 are registered, then processing ends. Otherwise a branch is made to operation 720.

At operation 720, the processing module 221 communicates a node delete message to the root node 602, the parent node of the intermediary node 604 on the base tree. Further, the node delete message may include the remaining first hop node information 238 (e.g., all remaining logical node identifiers 247).

At operation 722, the processing module 221 removes the remaining logical node identifiers 247 from the first hop node information 238. This operation constitutes removal of the intermediary node 604 from the membership tree.

At decision operation 724, at the root node 602, the receiving module 219 receives the node delete message and the processing module 221 stores the remaining first hop node information (e.g., logical node identifier(s)) in the first hop node information 238 under the multicast group 222 corresponding to the subscribers leave request and under the sub-tree 245 corresponding to the intermediary node 604

Base Tree Construction

Figure 21:
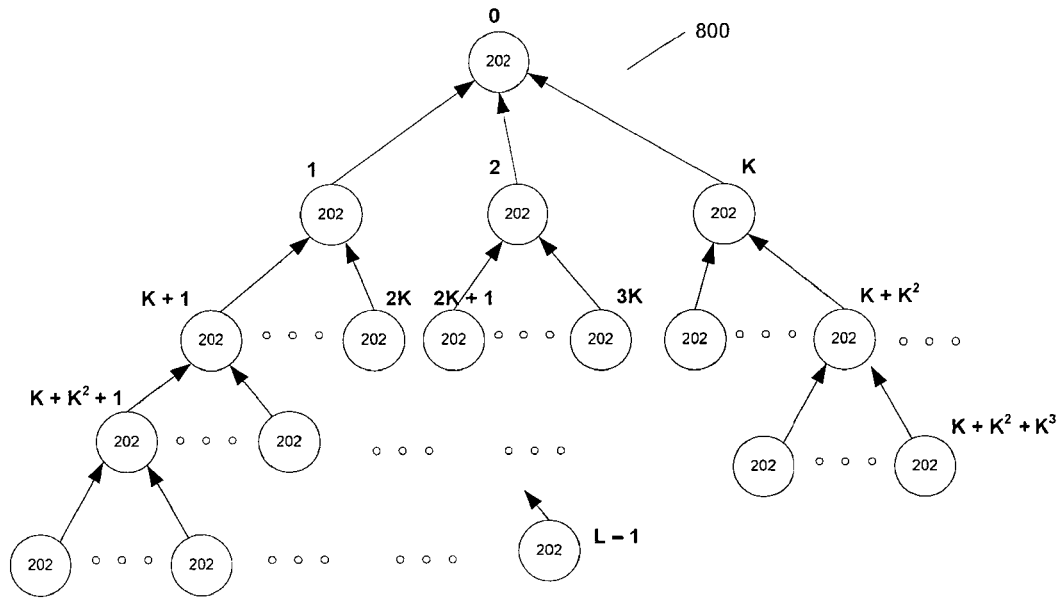
FIG. 21 is a diagram illustrating a base tree, according to an embodiment.

FIG. 21 is a diagram illustrating a base tree 800, according to an embodiment. The base tree 800 (BT) may include nodes 202 (*l*) (e.g., routers (l)). In one embodiment, at each logical overlay router l, a balanced k-ary base tree BT(l) may be constructed as follows.

First, a BT at logical node identifier "0" may be constructed. For example, BT(0) in the form of base tree 800 may be constructed by sequentially positioning logical overlay routers $0, \ldots, L-1$ onto a regular (i.e., constant-fanout) k-ary tree as shown in FIG. 21, according to an embodiment. Specifically, one logical overlay router may be positioned at depth 0 (i.e., the root), k logical overlay routers may be positioned at depth 1, $k^2$ logical overlay routers may be positioned at depth 2, ..., until all L logical overlay routers have been positioned. Generally, the logical overlay routers that may be positioned at depth d have logical node identifiers 247 ranging from $K_d+1$ to $K_d+k^d$, where $K_d = \sum_{i=1}^{d-1} k^i$.

Next a BT(l) may be constructed from BT(0) by substituting each logical overlay router r in BT(0) with logical overlay router r'=l⊕r, where ⊕ denotes bitwise exclusive or (XOR). For example, the root of BT(l) is l⊕0=l, and the set of depth-1 nodes in BT(l) are l⊕1, l⊕2, ..., l⊕k.

Generating Parent and Children Logical Node Identifiers

Based on BT(l), for any given logical overlay router r, the parent and children in BT(l) may be generated as a function of l without requiring any node 202 to maintain any state for BT(l). Specifically, (i) the parent of r in BT(0) is ⌈r/k⌉−1, and (ii) the children of r in BT(0) are rk+1, rk+2, ..., rk+k. To obtain r's parent and children in BT(l), the system generates the logical node identifiers 247 for the parent node and the children nodes of r'=l⊕r in BT(0) and then XORl the resulted logical node identifiers 247.

Figure 22:
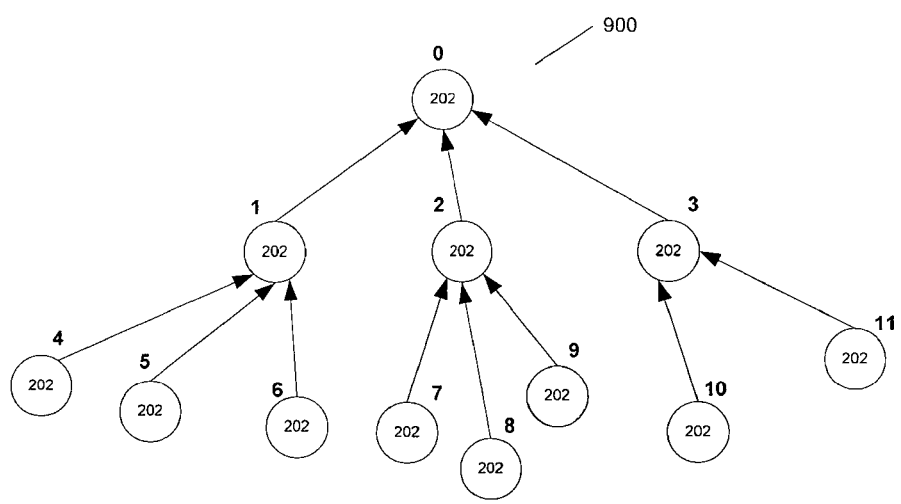
FIG. 22 is a diagram illustrating a base tree, according to an embodiment.

FIG. 22 is a diagram illustrating a base tree 900, according to an embodiment. The base tree 900 is an example of a k-ary tree generated based on system parameters that includes "k=3" (e.g., each internal node has k children), "L=12" (e.g., number of logical nodes in the base tree). In one embodiment the logical node identifiers 247 may be embodied as a "128" bit binary number. The logical root node identifier for the base tree 900 is shown to be zero. The processing module 221 may generate the base tree 900 as needed based on the above system configuration parameters and a multicast group identifier that hashes to the logical root node identifier of "0."

Figure 23:
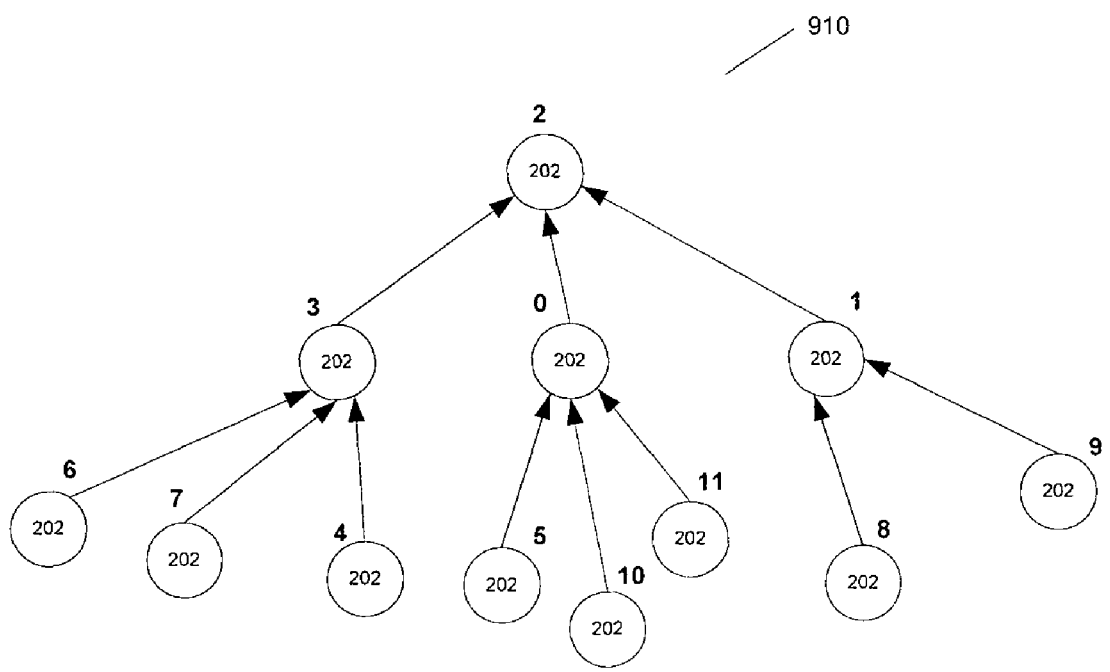
FIG. 23 is a diagram illustrating a base tree, according to an embodiment.

FIG. 23 is a diagram illustrating a base tree 910, according to an embodiment. The base tree 910 is an example of a k-ary tree that uses the same system parameters as base tree 900. However, the base tree 910 is shown to be rooted at logical root node identifier "2" instead of "0." It may be observed that the same logical node identifiers 247 that appear in base tree 900 also appear in a different order in the base tree 910. The logical node identifiers 247 for the base tree 910 may be generated as described above by an XOR the logical node identifier 247 for the root node (e.g., two) against the each of the logical root node identifiers 247 in the base tree (0) as illustrated in FIG. 24.

FIG. 24 is a table 912, according to an embodiment, illustrating the generation of base tree 910 based on base tree 900. For example, the logical node identifiers 247 for the base tree 900 are respectively XOR'd with the logical node identifier 247 (e.g., two) of the core node (e.g., root node) of the base tree 910 to generate the corresponding logical node identifiers 247 for the base tree 910.

Figure 25:
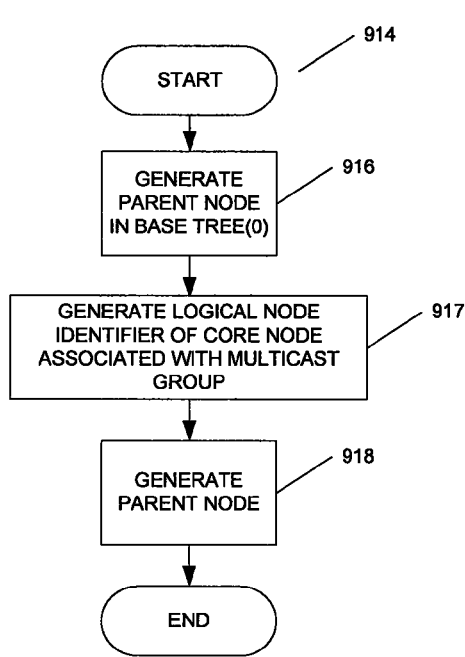
FIG. 25 is a flow chart illustrating a method, according to an embodiment, to generate a logical node identifier for a parent node.

FIG. 25 is a flow chart illustrating a method 914, according to an embodiment, to generate a logical node identifier 247 for a parent node. For example, the processing module 221 may receive a logical node identifier 247 for a node "r", a multicast group identifier for a multicast group "g", and a request to identify the parent node of the node "r" in a base tree associated with multicast group "g." At operation 916, the processing module 221 first utilizes the following equation where "k" is a system parameter expressing the maximum number of children nodes associated with each node in a base tree rooted at a core node identified by a logical node identifier 247 of "0."

$$\lceil r/k \rceil - 1$$

Using the same system parameters used to generate the base tree 900 (e.g., illustrated in FIG. 22) (e.g., k=3) the above equation may yield the following results:

$$[2/3]-1=0$$

It will be observed that fractions are rounded up to the next largest integer and there will not be any negative numbers.

At operation 917, the processing module 221 generates the logical node identifier 247 of the core node of the base tree associated with the identified multicast group "g." Specifically, a hash function may be used to map the multicast group identifier "g" to the logical node identifier 247 of the core node "z" in the base tree for the multicast group "g." In the present example, the hash function yields a logical node identifier 247 of "2."

At operation 918, the processing module 221 uses the result from the operation 916 (e.g., 0 expressed as 0000 in binary) and the logical node identifier from the operation 917 (e.g., 2 expressed as 0010 in binary) to generate the logical node identifier 247 for the parent node as follows:

0000 XOR 0010=0010

Accordingly, the logical node identifier 247 of the parent node of node "0" in the base tree associated with multicast group "g" is "2," as may be verified in the base tree 910 on FIG. 23.

Figure 26:
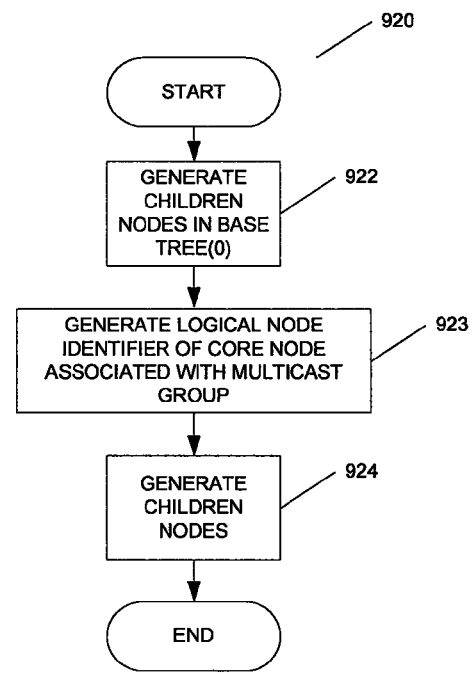
FIG. 26 is a flow chart illustrating a method, according to an embodiment, to generate logical node identifiers for children nodes.

FIG. 26 is a flow chart illustrating a method 920, according to an embodiment, to generate logical node identifiers for children nodes. For example, the processing module 221 may receive a logical node identifier 247 for a node "r", a multicast group identifier for a multicast group "g", and a request to identify the children nodes of the node "r" in a base tree associated with multicast group "g." At operation 922, the processing module 221 utilizes the following equation where "k" is a system parameter expressing the maximum number of children nodes associated with each node in a base tree with a core node identified by a logical node identifier 247 of zero.

rk+1, rk+2, . . . , rk+k

Using the same system parameters used to generate the base tree 900 (e.g., illustrated in FIG. 22) (e.g., k=3) the above equation may yield the following results:

2(3)+1, 2(3)+2 and 2(3)+3,

Accordingly, the above equation yields the logical node identifiers "7," "8," and "9."

At operation 923, the processing module 221 generates the logical node identifier 247 of the core node of the base tree associated with the identified multicast group "g" as previously described in operation 917 in FIG. 25. In the present example, the hash function yields a logical node identifier 247 of "2."

At operation 924, the processing module 221 uses the result from the operation 916 (e.g., "7, 8, and 9" respectively expressed as 0111, 1000, and 1001 in binary) and the logical node identifier from the operation 923 (e.g., 2 expressed as 0010 in binary) to generate the logical node identifiers 247 for the children nodes as follows:

0111 XOR 0010=0101

1000 XOR 0010=1010

1001 XOR 0010=1011

Accordingly, the logical node identifier 247 of the children nodes of node "0" in the base tree associated with multicast group "g" is "5, 10 and 11," as may be verified in the base tree 910 on FIG. 23.

Figure 27:
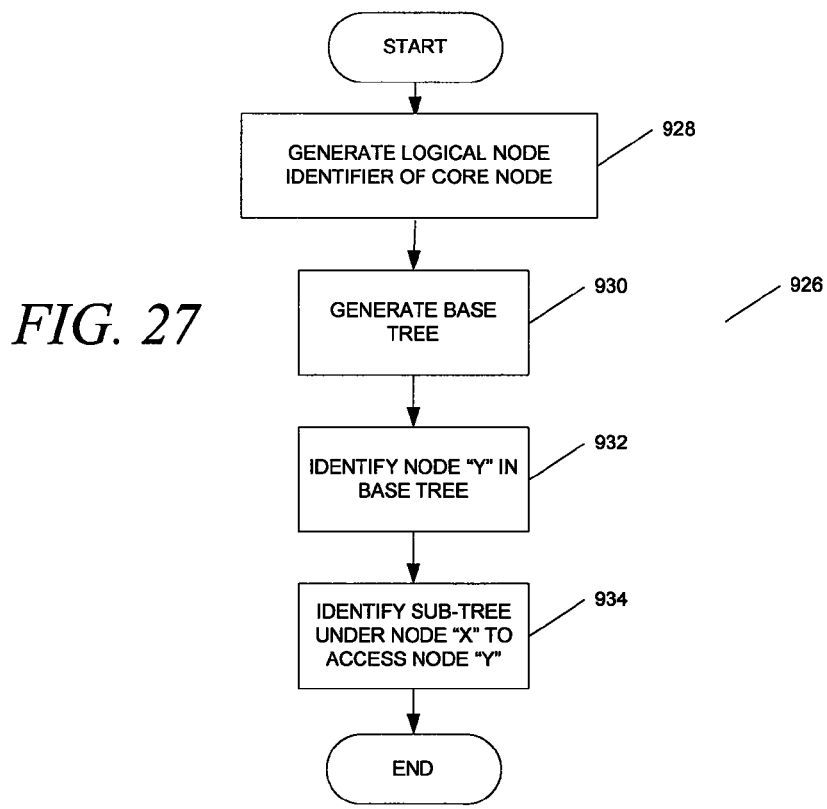
FIG. 27 is a flow chart illustrating a method, according to an embodiment, to identify a sub-tree in a base tree.
Figure 28:
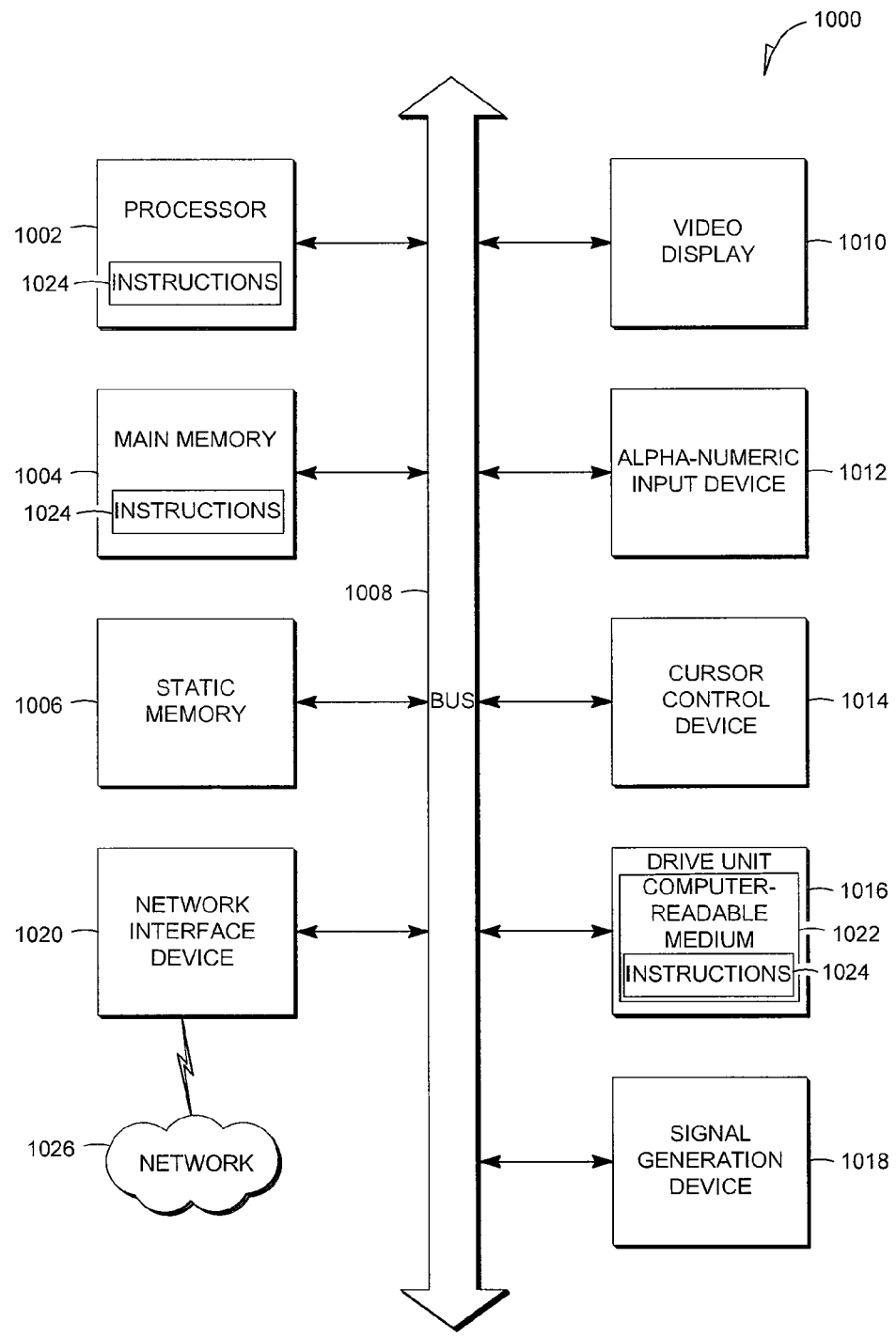
FIG. 28 is a block diagram of a machine, according to an example embodiment, including instructions to perform any one or more of the methodologies described herein.

FIG. 27 is a flow chart illustrating a method 926, according to an embodiment, to identify a sub-tree in a base tree. For example, the processing module 221 may receive a logical node identifier 247 for a node "x", a logical node identifier 247 for a node "y," a multicast group identifier for a multicast group "g", and a request to identify a child node of the node "x" that may be used to access the node "y" in a base tree associated with multicast group "g"

At operation 928, the processing module 221 may generate the logical node identifier 247 of the core node of the base tree associated with the identified multicast group "g" as previously described in operation 917 in FIG. 25. In the present example, the hash function may yield a logical node identifier 247 of "2."

At operation 930, the processing module 221 may generate the base tree associated with the multicast group "g." For example, the processing module 221 may first generate the logical node identifiers 247 for a base tree rooted at a core node with a logical node identifier of "0." Next, the processing module 221 may generate the logical node identifiers 247 for the base tree for the multicast group "g" by XOR the logical node identifiers generated in operation 930 (e.g., base tree at "0") with the logical node identifier 247 generated in operation 928 (e.g., "2").

At operation 932, the processing module 221 may identify the node "y" in the base tree. associated with the multicast group "g."

At operation 934, the processing module 221 may identify the node "x" in the base tree. associated with the multicast group "g" Finally, the processing module identifies a child node of node "x" that may be used to access the node "y."

Other Embodiments-Overlay Routers

The above described MAD approach may be embodied at the application layer using only end systems (e.g., end hosts 204). In an overlay or end-system approach participating peers may organize themselves into an overlay topology for data delivery. Each end of an overlay link in this topology corresponds to a unicast path between two-end systems or peers in the underlying network (e.g., Internet). All multicast-related functionality is implemented in the peers instead of at the nodes 202 (e.g., routers) to construct and maintain an efficient overlay for data transmission.

Other Embodiments-MAD Across Domains

MAD may be used to identify a set of nodes 202 (e.g., routers) in the same region or network domain (e.g., university network, corporate network, and AS) to denote a "MAD domain." MAD domains may serve two goals: (i) enable MAD to operate across multiple administrative domains, and (ii) to respond to heterogeneity and load imbalance by promoting autonomous decisions in local networks.

Leaders and Super-domains

Within a MAD domain a subset of nodes 202 (e.g., routers) may be identified. The subset of nodes 202 may be candidates from which one node 202 may be selected as a leader for a multicast group 222. For example, for any multicast group 222 with multicast members 304 in the MAD domain, a leader may be selected from the subset of nodes 202 uniformly at random (e.g., as a hash of the multicast group id). In one embodiment, the subset of nodes 202 may be respectively identified with a leader logical node identifier 225 that may be stored as domain information 220. All communications for the multicast group 222 (both in and out of the MAD domain) may be communicated through the leader for the multicast group 222. Further, the set of leaders may be exposed outside the MAD domain. The union of leaders in all of the MAD domains may form a Super-domain. The Super-domain may be responsible for forwarding multicast traffic between MAD domains. In addition, a single core node (e.g., node 202) for a specific multicast group 222 may be selected from the leaders in the Super-domain. To forward multicast traffic, the core node may forward multicast traffic to the leaders associated with the respective MAD domains included in the Super-domain; the leader in each MAD domain may then, in turn, forward the traffic to the leaf nodes (e.g., first hop nodes 202) over the dissemination and/or membership trees.

Autonomy

MAD may support autonomous decision making in each of the respective MAD domains. A local MAD domain may identify whether specific multicast groups 222 may communicate using either a dissemination tree 10 for efficient forwarding or a resource efficient membership tree 100. This may enable exploiting: (a) The spatial locality of multicast group 222 activity; and, (b) The resource efficiency in local administrative domains. Specifically, a multicast group 222 may be in active mode (e.g., using the dissemination tree 10) to efficiently forward frequent updates to large number of nodes 202 in a local domain, where popular local events are associated with increased multicast traffic. For example, to utilize resources efficiently, MAD domains in a resource-starved region (e.g., with low-end routers) may not be able to afford the use of the more state-intensive dissemination tree 10 communication for all the globally popular multicast groups 222 that are of less interest within the region.

Locating Leader ID and Core ID

Since all multicast group 222 communications may be communicated via the leader (e.g., node 202) in the domain, the leader may be burdened with a heavy load of traffic and state. In one embodiment this problem may be alleviated by distributing leader roles to multiple nodes 202 (e.g., routers). A list of leader node identifiers may be maintained in all the routers (e.g., nodes 202) within the MAD domain. A MAD domain identifier may be pre-appended to each leader logical node identifier 225 to support multiple MAD domains. MAD nodes 202 (e.g., routers) in the Super-domain may have a special domain identifier, namely, the core logical node identifier of the multicast group 222 may be selected by picking a leader from the Super-domain by using a hash value of an identifier for the multicast group 222. Also, the leader of specific multicast groups 222 in each domain may be selected from the list of leader logical node identifiers 225 in a similar manner.

Additional Details

Group management: To enable MAD to operate across administrative boundaries, in one embodiment, leaders may forward multicast traffic outside a first domain to a multicast border router (e.g., node 202) in a second domain that is responsible for forwarding multicast traffic within the second domain.

When building membership tree 100 state, leaders may not export subscriber information 304 to the core node (e.g., node 202) even if the current number of first hop routers with multicast member size is below a minimum threshold, according to one embodiment. MAD domains may achieve local privacy by containing sensitive data—such as number of multicast subscribers and multicast subscriber IP addresses to be within the administrative domain, according to one embodiment.

Mode transition: Instead of having a multicast group 222 change modes from inactive mode (e.g., using the membership tree 100) to active mode (e.g., using dissemination tree 10) across the entire network in an all-or-nothing mode change, each MAD domain may identify the mode for a multicast group 222 and communicate the mode to the core node, according to one embodiment. Depending on the global activity and resource availability, the core node (e.g., node 202) may then determine to use the membership tree 100 or the dissemination tree 10 to reach the leader nodes. Note that in one embodiment the core-to-leader communication may use a different mode from leader-to-leaf communication even for the same multicast group 222.

FIG. 21 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a router a switch or bridge, a server computer, a client computer, a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical media and magnetic media.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

What is claimed is:

1. A method comprising:
    receiving, by a system, a request to add a first node to a membership tree including a first plurality of nodes associated with a multicast group;
    identifying, by the system, a second node in the first plurality of nodes, wherein the first and second nodes are separated from each other by at least one other node of the first plurality of nodes, wherein identifying the second node includes identifying a sub-tree including a second plurality of nodes that includes the second node and the first node;
    communicating, by the system, a node identifier that identifies the first node over a network to the second node, the node identifier to be stored at the second node to add the first node to the membership tree, the node identifier to be stored in the membership tree exclusively at the second node to enable the second node to forward the multicast traffic to the first node; and
    wherein the first node is associated with a multicast member that has been added to the multicast group, wherein the multicast member is stored in a database that is managed by a subscription manager that communicates over a network with the first node and wherein the database comprises map information to map logical node identifiers to physical node identifiers, dissemination tree information, membership tree information comprising information used for communicating multicast traffic over the membership tree, mode transition information used for transitioning from a transient mode to an active mode, and domain information used to communicate multicast traffic across administrative domains.

2. The method of claim 1, wherein the second plurality of nodes are exclusively accessed in the membership tree via the second node.

3. The method of claim 1, comprising identifying, by the system, a third plurality of nodes included in the first and second plurality of nodes that are respectively associated with node identifiers used to forward multicast traffic over the membership tree for the multicast group.

4. The method of claim 3, wherein the communicating is responsive to comparing a count of the number of nodes in the third plurality of nodes to a predetermined threshold.

5. The method of claim 4, comprising increasing, by the system, the predetermined threshold to decrease branching in the membership tree and to increase a quantity of state information stored at the second node.

6. The method of claim 4, comprising decreasing, by the system, the predetermined threshold to increase branching in the membership tree and to decrease a quantity of state information that is stored at the second node.

7. The method of claim 3, wherein the first plurality of nodes are included in a base tree that includes a fourth plurality of nodes, wherein the base tree is a k-ary tree, wherein the fourth plurality of nodes are respectively associated with a plurality of logical router identifiers that are generated based on a multicast group identifier associated with the multicast group.

8. A system comprising:
a receiving device configured to receive a request to add a first node to a membership tree including a first plurality of nodes associated with a multicast group;
a memory storing computer instructions; and
a processing device coupled to the memory, wherein the processing device, responsive to executing the computer instructions, performs operations comprising:
identifying a second node in the first plurality of nodes;
communicating a node identifier that identifies the first node over a network to the second node, the node identifier to be stored at the second node to add the first node to the membership tree, the node identifier to be stored in the membership tree exclusively at the second node to enable the second node to forward the multicast traffic to the first node, wherein the first and second nodes are separated from each other by at least one other node of the first plurality of nodes;
identifying a sub-tree including a second plurality of nodes that includes the second node and the first node; and
wherein the first node is associated with a multicast member that has been added to the multicast group, wherein the multicast member is stored in a database that is managed by a subscription manager that communicates over a network with the first node and wherein the database comprises map information, dissemination tree information, membership tree information, mode transition information used for transitioning from a transient mode to an active mode, and domain information used to communicate multicast traffic across administrative domains.

9. The system of claim 8, wherein the second plurality of nodes are exclusively accessed in the membership tree via the second node.

10. The system of claim 9, wherein the processing device, responsive to executing the computer instructions, performs operations comprising identifying a third plurality of nodes included in the first and second plurality of nodes that are respectively associated with node identifiers used to forward multicast traffic over the membership tree for the multicast group.

11. The system of claim 10, wherein the processing device, responsive to executing the computer instructions, performs operations comprising communicating in response to a comparison of a count of the number of nodes in the third plurality of nodes to a predetermined threshold.

12. The system of claim 11, wherein the processing device, responsive to executing the computer instructions, performs operations comprising increasing the predetermined threshold to decrease branching in the membership tree and to increase a quantity of state information stored at the second node.

13. The system of claim 11, wherein the processing device, responsive to executing the computer instructions, performs operations comprising decreasing the predetermined threshold to increase branching in the membership tree and to decrease a quantity of state information that is stored at the second node.

14. The system of claim 10, wherein the first plurality of nodes are included in a base tree that includes a fourth plurality of nodes, wherein the base tree is a k-ary tree, wherein the fourth plurality of nodes are respectively associated with a plurality of logical router identifiers that are generated based on a multicast group identifier associated with the multicast group.

15. A system comprising:
a receiver receiving a request to add a first node to a membership tree including a first plurality of nodes associated with a multicast group;
a memory storing computer instructions; and
a processor coupled to the memory, wherein the processor, responsive to executing the computer instructions, performs operations comprising;
identifying a second node in the first plurality of nodes;
communicating a node identifier that identifies the first node over a network to the second node, the node identifier to be stored at the second node to add the first node to the membership tree, the node identifier to be stored in the membership tree exclusively at the second node to enable the second node to forward the multicast traffic to the first node, wherein the first and second nodes are separated from each other; and
identifying a sub-tree including a second plurality of nodes that includes the second node and the first node; and
wherein the first node is associated with a multicast member that has been added to the multicast group, wherein the multicast member is stored in a database that is managed by a subscription manager that communicates over a network with the first node and wherein the database comprises map information, dissemination tree information, membership tree information, mode transition information used for transitioning from a transient mode to an active mode, and domain information used to communicate multicast traffic across administrative domains.

16. A non-transitory machine-readable medium storing instructions that, when executed by a machine, cause the machine to perform operations comprising:
receive receiving a request to add a first node to a membership tree including a first plurality of nodes associated with a multicast group;
identifying a second node in the first plurality of nodes, wherein the identifying the second node includes identifying a sub-tree including a second plurality of nodes that includes the second node and the first node;
communicating a node identifier that identifies the first node over a network to the second node, the node identifier to be stored at the second node to add the first node to the membership tree, the node identifier to be stored in the membership tree exclusively at the second node to enable the second node to forward the multicast traffic to the first node, wherein the first and second nodes are separated from each other by at least one other node of the first plurality of node; and
wherein the first node is associated with a multicast member that has been added to the multicast group, wherein the multicast member is stored in a database that is managed by a subscription manager that communicates over a network with the first node and wherein the information, mode transition information used for transitioning from a transient mode to an active mode, and domain information used to communicate multicast traffic across administrative domains.

* * * * *